US012731408B2

(12) United States Patent
Porav et al.

(10) Patent No.: US 12,731,408 B2
(45) Date of Patent: Sep. 8, 2026

(54) SYSTEMS AND METHODS FOR PERFORMING TASKS BASED UPON DETECTED AUTONOMOUS VEHICLE ENVIRONMENTAL CONDITIONS

(71) Applicant: Oxa Autonomy Ltd, Oxford (GB)

(72) Inventors: Horia Porav, Oxford (GB); Ben Upcroft, Oxford (GB); Paul Newman, Oxford (GB)

(73) Assignee: Oxa Autonomy Ltd, Oxford (GB)

( * ) Notice: Subject to any disclaimer, the term of this patent is extended or adjusted under 35 U.S.C. 154(b) by 235 days.

(21) Appl. No.: 18/701,575

(22) PCT Filed: Oct. 17, 2022

(86) PCT No.: PCT/GB2022/052630
§ 371 (c)(1),
(2) Date: Apr. 15, 2024

(87) PCT Pub. No.: WO2023/062390
PCT Pub. Date: Apr. 20, 2023

(65) Prior Publication Data

US 2024/0420482 A1 Dec. 19, 2024

(30) Foreign Application Priority Data

Oct. 15, 2021 (GB) ..................................... 2114808

(51) Int. Cl.
*G06V 20/56* (2022.01)
*G06V 10/77* (2022.01)
*G06V 10/82* (2022.01)

(52) U.S. Cl.
CPC .......... *G06V 20/56* (2022.01); *G06V 10/7715* (2022.01); *G06V 10/82* (2022.01)

(58) Field of Classification Search
CPC .. G06V 20/56; G06V 10/764; G06V 10/7715; G06V 10/82; G06V 10/774;
(Continued)

(56) References Cited

U.S. PATENT DOCUMENTS

2005/0286767 A1 12/2005 Hager et al.
2014/0204081 A1 7/2014 Dobes et al.
(Continued)

FOREIGN PATENT DOCUMENTS

CN 111369605 A 7/2020
CN 112721909 A 4/2021
(Continued)

OTHER PUBLICATIONS

Horia et al., "Don't Worry About the Weather: Unsupervised Condition-Dependent Domain Adaptation", 2019 IEEE Intelligent Transportation Systems Conference, pub. 2019. (Year: 2019).*
(Continued)

*Primary Examiner* — Mekonen T Bekele
(74) *Attorney, Agent, or Firm* — KPPB LLP

(57) ABSTRACT

A computer-implemented method of generating training data, the method comprising: providing a representation of an environment, wherein the representation of the environment has a defined structure and/or a defined geometry; and generating the training data comprising a set of transformed representations, including a first transformed representation, of the environment by transforming the representation of the environment to the set of transformed representations, including the first transformed representation, of the environment;
wherein providing the representation of the environment comprises synthesizing, at least in part, an image of the environment using semantic information.

11 Claims, 21 Drawing Sheets

(58) Field of Classification Search
CPC ....... G06V 20/20; G06F 18/24; G06F 18/214; G06N 3/045; G06N 3/08; G06N 20/20; G06T 2207/10004; G06T 2207/20081; G06T 2207/20084; G06T 2207/30252; G06T 7/0004; G06T 11/00; G06T 3/00
See application file for complete search history.

(56) References Cited

U.S. PATENT DOCUMENTS

| | | | |
|---|---|---|---|
| 2015/0211868 | A1 | 7/2015 | Matsushita et al. |
| 2017/0076455 | A1 | 3/2017 | Newman et al. |
| 2018/0196436 | A1 | 7/2018 | Gupta |
| 2019/0129436 | A1 | 5/2019 | Sun et al. |
| 2019/0318040 | A1 | 10/2019 | Chaudhury et al. |
| 2019/0355257 | A1 | 11/2019 | Caldwell et al. |
| 2020/0026296 | A1 | 1/2020 | Hoedt |
| 2020/0278686 | A1 | 9/2020 | Liu et al. |
| 2020/0341474 | A1 | 10/2020 | Zuo |
| 2020/0379481 | A1 | 12/2020 | Newman et al. |
| 2021/0139048 | A1 | 5/2021 | Russell et al. |
| 2021/0208596 | A1 | 7/2021 | Tong et al. |
| 2021/0253128 | A1 | 8/2021 | Nister et al. |
| 2021/0302982 | A1 | 9/2021 | Yasui et al. |
| 2021/0387617 | A1 | 12/2021 | Bauch et al. |
| 2021/0387647 | A1 | 12/2021 | Koopman, Jr. |
| 2022/0048533 | A1 | 2/2022 | Ödblom |
| 2022/0108049 | A1 | 4/2022 | Letwin et al. |
| 2022/0146415 | A1* | 5/2022 | Putkaradze ........ G01N 33/0001 |
| 2022/0185302 | A1 | 6/2022 | Dev et al. |
| 2022/0194395 | A1 | 6/2022 | Venkatadri et al. |
| 2022/0230536 | A1 | 7/2022 | Tkachenko et al. |

FOREIGN PATENT DOCUMENTS

| | | | |
|---|---|---|---|
| CN | 114331879 | A | 4/2022 |
| EP | 3372467 | A1 | 9/2018 |
| RU | 2658679 | C1 | 6/2018 |
| WO | 2019141992 | A1 | 7/2019 |
| WO | 2020061603 | A1 | 4/2020 |
| WO | 2021092702 | A1 | 5/2021 |
| WO | 2021164615 | A1 | 8/2021 |
| WO | 2021183256 | A1 | 9/2021 |
| WO | 2023062390 | A1 | 4/2023 |
| WO | 2023062392 | A1 | 4/2023 |
| WO | 2023062393 | A1 | 4/2023 |
| WO | 2023062394 | A1 | 4/2023 |
| WO | 2023067325 | A1 | 4/2023 |
| WO | 2023067326 | A1 | 4/2023 |
| WO | 2023067327 | A1 | 4/2023 |
| WO | 2023214159 | A1 | 11/2023 |
| WO | 2023214160 | A1 | 11/2023 |

OTHER PUBLICATIONS

Huaian Chen et al al., "Semisupervised Semantic Segmentation by Improving Prediction Confidence" publication Mar. 29, 2021; IEEE Transactions on Neural Networks and Learning Systems, vol. 33 , (Year: 2021).*
Examination Report under Section 18(3) for GB Patent Application No. 2206457.0, dated Jun. 13, 2024, 6 pgs.
Examination Report under Sections 17 and 18(3) for GB Patent Application No. 2206452.1, dated Nov. 1, 2022, 7 pgs.
Examination Report under Sections 17 and 18(3) for GB Patent Application No. 2206457.0, dated Oct. 26, 2022, 7 pgs.
Examination Report under Sections 17 and 18(3) for GB Patent Application No. 2303083.6, dated Mar. 27, 2023, 5 pgs.
International Search Report and Written Opinion for International Application No. PCT/GB2023/051160, Search completed Oct. 16, 2023, Mailed Oct. 25, 2023, 20 Pgs.
International Search Report and Written Opinion for International Application No. PCT/GB2023/051162, Search completed Jun. 14, 2023, Mailed Jun. 21, 2023, 4 Pgs.
Prakash et al., "Multi-Modal Fusion Transformer for End-to-End Autonomous Driving", 2021 IEEE/CVF Conference on Computer Vision and Pattern Recognition (CVPR) DOI 10.1109/CVPR46437.2021.00700, 2021.
Shu et al., "Bottleneck Conditional Density Estimation", arxiv.org, Cornell University Library, 201 Olin Library Cornell University Ithaca, NY 14853, Nov. 25, 2016, XP080734635.
Shu et al., "Bottleneck Conditional Density Estimation", arXiv:1611.08568v3 [stat.ML] Jun. 30, 2017.
Xu et al., "Worst Perception Scenario Search for Autonomous Driving", 2020 IEEE Intelligent Vehicles Symposium (IV), IEEE, Oct. 19, 2020, pp. 1702-1707, XP033872685, DOI: 10.1109/IV47402.2020.9304731.
Zlocki, "Securing Automated Driving—The Database Approach in Pegasus", Conference connected and Automated Driving Together, Shaping the Future : Day 1, Session: Vehicle Validation/Certification Roadworthiness Testing, Apr. 3, 2017.
Examination Report for GB Patent Application No. 2114809.3, Apr. 11, 2022, 5 pgs.
GB Patent Application No. 2114945.5, Jun. 21, 2022, 19 pgs.
International Preliminary Patentability Report for International Application No. PCT/GB2022/0052652, Apr. 23, 2024, 12 pgs.
International Preliminary Report on International Application No. PCT/GB2022/052640, Issued Apr. 16, 2024, 7 pgs.
International Preliminary Report on Patentability for International Application No. PCT/GB2022/052630, Issued Apr. 16, 2024, 10 pgs.
International Preliminary Report on Patentability for International Application No. PCT/GB2022/052636, Report Issued Apr. 16, 2024, 7 pgs.
International Preliminary Report on Patentability for International Application No. PCT/GB2022/052650, Apr. 23, 2024, 18 pgs.
International Preliminary Report on Patentability for International Application No. PCT/GB2022/052651, Apr. 23, 2024, 19 pgs.
International Preliminary Report on Patentability for International Application No. PCT/GB2022/52639, Issued Apr. 16, 2024, 7 pgs.
International Search Report and Written Opinion for International Application No. PCT/GB2022/0052652, Search completed Jan. 9, 2023, Mailed Jan. 20, 2023, 14 Pgs.
International Search Report and Written Opinion for International Application No. PCT/GB2022/052630, Search completed Jan. 10, 2023, Mailed Jan. 20, 2023, 12 Pgs.
International Search Report and Written Opinion for International Application No. PCT/GB2022/052636, Search completed Dec. 21, 2022, Mailed Jan. 5, 2023, 11 Pgs.
International Search Report and Written Opinion for International Application No. PCT/GB2022/052640, Search completed Jan. 3, 2023, Mailed Jan. 18, 2023, 09 Pgs.
International Search Report and Written Opinion for International Application No. PCT/GB2022/052650, Search completed Jan. 12, 2023, Mailed Jan. 20, 2023, 26 Pgs.
International Search Report and Written Opinion for International Application No. PCT/GB2022/052651, Search completed Jan. 13, 2023, Mailed Jan. 31, 2023, 23 Pgs.
International Search Report and Written Opinion for International Application No. PCT/GB2022/52639, Search completed Dec. 29, 2022, Mailed Jan. 18, 2023, 09 Pgs.
Search Report and Written Opinion for GB Application No. 2114808.5, Search completed May 27, 2022, 9 pgs.
Search Report for GB Patent Application No. 2114944.8, Jul. 29, 2022, 12 pgs.
Behzadan et al., "Adversarial Reinforcement Learning Framework for Benchmarking Collision Avoidance Mechanisms in Autonomous Vehicles", arXiv:1806.01368v1 [cs.RO] Jun. 4, 2018.
Bosse et al., "Keypoint design and evaluation for place recognition in 2D lidar maps", Robotics and Autonomous Systems, Elsevier BV, Amsterdam, NL, vol. 57, No. 12, Dec. 31, 2009 (Dec. 31, 2009), pp. 1211-1224, XP026746016, ISSN: 0921-8890, DOI: 10.1016/J.ROBOT.2009.07.009.
Brownlee, "How to Calculate Principal Component Analysis (PCA) from Scratch in Python", https://machinelearningmastery.com/, Aug.

(56) References Cited

OTHER PUBLICATIONS 9, 2019, pp. 1-28, XP055924999, Retrieved from the Internet: URL: https://machinelearningmastery.com/calculate-principalcomponent-analysis-scratch-python/.
Cen et al., "Precise Ego-Motion Estimation with Millimeter-Wave Radar Under Diverse and Challenging Conditions", 2018 IEEE International Conference on Robotics and Automation (ICRA), May 21, 2018, pp. 1-8, XP033403205, DOI: 10.1109/ICRA.2018.8460687.
Cen et al., "Radar-only ego-motion estimation in difficult settings via graph matching", 2019 International Conference on Robotics and Automation (ICRA), IEEE, May 20, 2019, pp. 298-304, XP033593985, DOI: 10.1109/ICRA.2019.8793990.
Chen et al., "GeoSim: Realistic Video Simulation via Geometry-Aware Composition for Self-Driving", Proceedings of the IEEE/CVF Conference on Computer Vision and Pattern Recognition (CVPR), 2021, pp. 7230-7240.
De Martini et al., "kRadar++: Coarse-to-Fine FMCW Scanning Radar Localisation", Sensors, MDPI, CH, Nov. 1, 2020, vol. 20, No. 21, pp. 1-23, XP009535871, ISSN: 1424-8220, DOI: 10.3390/S20216002.
Ding et al., "CMTS: A Conditional Multiple Trajectory Synthesizer for Generating Safety-Critical Driving Scenarios", arXiv:1910.00099v2 [cs.LG] Oct. 2, 2019.
Ding et al., "Learning to Collide: An Adaptive Safety—Critical Scenarios Generating Method", arxiv.org, Cornell University Library, Cornell University Ithaca, NY 14853, Jul. 23, 2020, XP081706097.
Gawel et al., "Structure-based vision-laser matching", 2016 IEEE/RSJ International Conference on Intelligent Robots and Systems (IROS), IEEE, Oct. 9, 2016, pp. 182-188, XP033011403, DOI: 10.1109/IROS.2016.7759053.
Gleave et al., "Adversarial Policies: Attacking Deep Reinforcement Learning", arXiv:1905.10615v3 [cs.LG] Jan. 17, 2021.
Himstedt et al., "Large scale place recognition in 2D LIDAR scans using Geometrical Landmark Relations", 2014 IEEE/RSJ International Conference on Intelligent Robots and Systems, IEEE, Sep. 14, 2014, pp. 5030-5035, XP032676853, DOI: 10.1109/IROS.2014.6943277.
Koren et al., "Adaptive Stress Testing for Autonomous Vehicles", arXiv:1902.01909v1 [cs.RO] Feb. 5, 2019.
Koren et al., "The Adaptive Stress Testing Formulation", arXiv:2004.04293v1 [cs.RO] Apr. 8, 2020.
Kuhnl, "Road Terrain Detection for Advanced Driver Assistance System", May 21, 2013, pp. 1-152, XP055117968, Retrieved from the Internet: URL: http://pub.uni-bielefeld.de/luur/download?func=downloadFile&recordOld=2633277&fileOld=2633278.
Kuutti et al., "Training Adversarial Agents to Exploit Weaknesses in Deep Control Policies", arXiv:2002.12078v1 [cs.LG] Feb. 27, 2020.
Lee et al., "Adaptive Stress Testing: Finding Likely Failure Events with Reinforcement Learning", arxiv.org, Cornell University Library, 201 Olin Library Cornell University Ithaca, NY 14853, Dec. 4, 2020, XP081829250.
Machida et al., "Deep Photo Relighting by Integrating Both 2D and 3D Lighting Information", 2020 25th International Conference on Pattern Recognition (ICPR), IEEE, Jan. 10, 2021 (Jan. 10, 2021), pp. 8446-8452, XP033908865, DOI: 10.1109/ICPR48806.2021.9413179.
Park et al., "Semantic Image Synthesis with Spatially-Adaptive Normalization", arXiv:1903.07291v2 [cs.CV] Nov. 5, 2019.
Porav et al., "Adversarial Training for Adverse Conditions: Robust Metric Localisation using Appearance Transfer", arXiv:1803.03341v1 [cs.CV] Mar. 9, 2018.
Porav et al., "Don't Worry About the Weather: Unsupervised Condition-Dependent Domain Adaptation", arXiv:1907.11004v1 [cs.CV], Jul. 25, 2019, Retrieved from: https://arxiv.org/pdf/1907.11004, 8 pgs.
Porav et al., "Don't Worry About the Weather: Unsupervised Condition-Dependent Domain Adaptation", 2019 IEEE Intelligent Transportation Systems Conference (ITSC), IEEE, Oct. 27, 2019, pp. 33-40, XP033668402, DOI: 10.1109/ITSC.2019.8917073.
Qi et al., "Semi-parametric Image Synthesis", arXiv:1804.10992v1 [cs.CV] Apr. 29, 2018.
Ren et al., "Learning Traffic Behaviors by Extracting Vehicle Trajectories from Online Video Streams", 2018 IEEE 14th International Conference on Automation Science and Engineering (CASE), published 2018, IEEE, pp. 1276-1283.
Sarlin et al., "From Coarse to Fine: Robust Hierarchical Localization at Large Scale", rxiv.org, Cornell University Library, 201 OLIN Library Cornell University Ithaca, NY 14853, Dec. 9, 2018, XP081200041.
Uricar et al., "Yes, we GAN: Applying Adversarial Techniques for Autonomous Driving", arxiv.org, Cornell University Library, 201 Olin Library Cornell University Ithaca, NY 14853, Feb. 9, 2019, XP081590898, DOI: 10.2352/ISSN.2470-1173.2019.15.AVM-048.
Wang et al., "AdvSim: Generating Safety-Critical Scenarios for Self-Driving Vehicles", 2021 IEEE/CVF Conference on Computer Vision and Pattern Recognition (CVPR).
Wang et al., "High-Resolution Image Synthesis and Semantic Manipulation with Conditional GANs", arXiv:1711.11585v2 [cs.CV] Aug. 20, 2018.

* cited by examiner

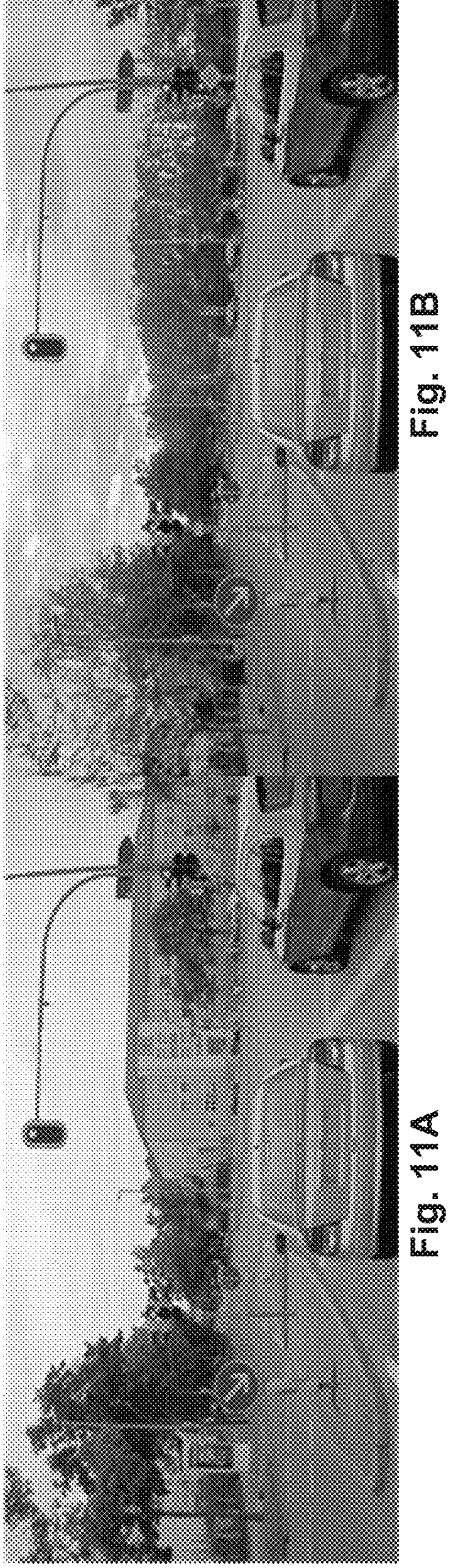
Fig. 11A
Fig. 11B
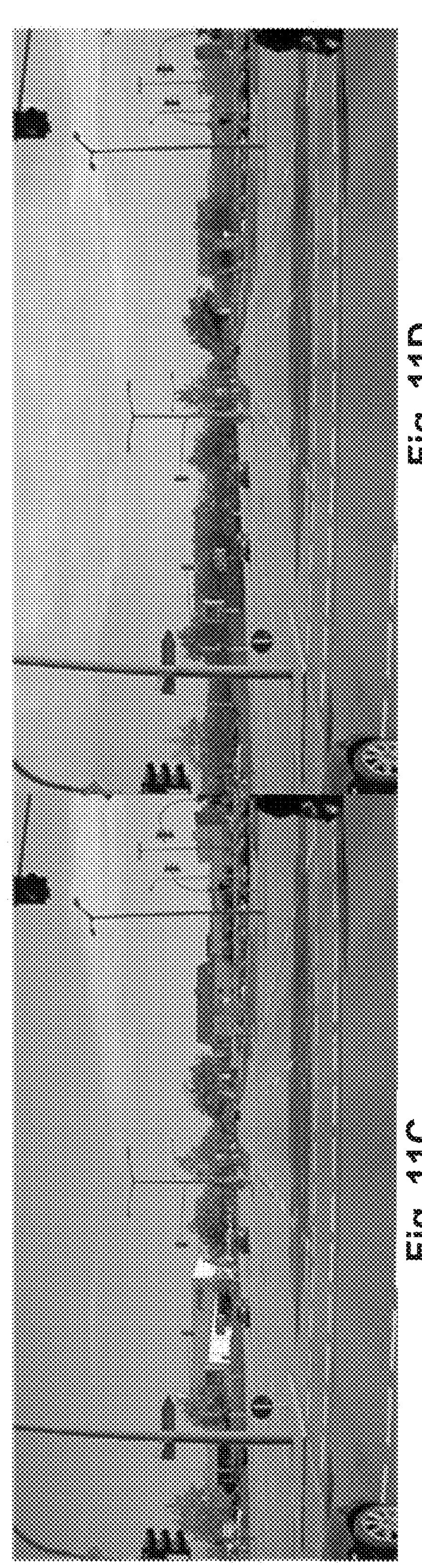
Fig. 11C
Fig. 11D

SYSTEMS AND METHODS FOR PERFORMING TASKS BASED UPON DETECTED AUTONOMOUS VEHICLE ENVIRONMENTAL CONDITIONS

CROSS-REFERENCE TO RELATED APPLICATIONS

The current application is U.S. National Stage of PCT Patent Application Serial No. PCT/GB2022/052630 filed Oct. 17, 2022, entitled "Method and Apparatus", which claims priority to U.K. Patent Application Serial No. 2114808.5 filed Oct. 15, 2021, entitled "Method and Computer". The disclosures of which are hereby incorporated by reference in their entireties.

FIELD

The present invention relates to autonomous vehicles.

BACKGROUND TO THE INVENTION

Conventional testing of control software (also known as AV stack) of autonomous vehicles (AVs), for example according to SAE Level 1 to Level 5, is problematic. For example, conventional methods for obtaining labelled training data for testing, for example installation, assurance, validation, verification, regression and/or progression testing, of control software for autonomous vehicles typically involves:

1. Collection of data, based on specific requirements (scenarios, scene structure, scene appearance, weather, operational domain, occurrence of scarce events); and
2. Labelling of data (instance segmentation in image and/or LIDAR space, action labelling etc)

These conventional methods are not only massively expensive and time-consuming, but require capturing low-probability events, which is many times impossible.

Hence, there is a need to obtaining training data.

SUMMARY OF THE INVENTION

A first aspect provides a computer-implemented method of generating training data, the method comprising:

providing a representation of an environment, wherein the representation of the environment has a defined structure and/or a defined geometry; and generating the training data comprising a set of transformed representations, including a first transformed representation, of the environment by transforming the representation of the environment to the set of transformed representations, including the first transformed representation, of the environment;

wherein providing the representation of the environment comprises synthesizing, at least in part, an image of the environment using semantic information.

The term "training data" may be expanded to include training, testing, validation and verification data.

A second aspect provides a computer-implemented method of training a machine learning, ML, algorithm, the method comprising:

generating training data comprising a set of transformed representations, including a first transformed representation, of an environment according to the first aspect; and training the ML algorithm comprising classifying the set of transformed representations according to a set of classes, including a first class.

A third aspect provides a computer-implemented method of determining a class of a representation of an environment using a machine learning, ML, algorithm trained according to the second aspect, the method comprising:

determining the class of the representation of the environment comprising inferring the class of the representation of the environment using the trained ML algorithm.

A fourth aspect provides a computer-implemented method of testing, for example installation, assurance, validation, verification, regression and/or progression testing of the ego-vehicle, for example of the control software thereof, the method comprising:

generating training data according to the first aspect;

simulating a scenario comprising the first transformed representation of the environment having therein an ego-vehicle, a set of actors, including a first actor, and optionally a set of objects, including a first object, wherein simulating the first scenario comprises; and identifying a defect of the ego-vehicle in the scenario.

A fifth aspect provides a computer comprising a processor and a memory configured to perform a method according to the first aspect, the second aspect, the third aspect and/or the fourth aspect.

A sixth aspect provides a computer program comprising instructions which, when executed by a computer comprising a processor and a memory, cause the computer to perform a method according to the first aspect, the second aspect, the third aspect and/or the fourth aspect.

A seventh aspect provides a non-transient computer-readable storage medium comprising instructions which, when executed by a computer comprising a processor and a memory, cause the computer to perform a method according to the first aspect, the second aspect, the third aspect and/or the fourth aspect.

DETAILED DESCRIPTION OF THE INVENTION

According to the present invention there is provided a method, as set forth in the appended claims. Also provided is a computer program, a computer, a non-transient computer-readable storage medium and a vehicle. Other features of the invention will be apparent from the dependent claims, and the description that follows.

Method of Generating Training Data

The first aspect provides a computer-implemented method of generating training data, the method comprising:

providing a representation of an environment, wherein the representation of the environment has a defined structure and/or a defined geometry; and generating the training data comprising a set of transformed representations, including a first transformed representation, of the environment by transforming the representation of the environment to the set of transformed representations, including the first transformed representation, of the environment;

wherein providing the representation of the environment comprises synthesizing, at least in part, an image of the environment using semantic information.

Since the the training data are generated by transforming the representation of the at least partly synthesized environment, generation of training data is accelerated, which may be automatically labelled if the ground truth is maintained. Since the representation of the environment is synthesized, at least in part, using semantic information, low-probability events may be represented, thereby providing more comprehensive testing and hence improving safety of AV control software. In this way, obtaining training data for AVs is improved.

Additionally and/or alternatively, the first aspect provides a computer-implemented method for generating training data for machine learning models;

wherein the method is based on image generation from abstract representations (semantic information); and/or wherein the method is based on one or more learned or heuristics-based image transformations.

Examples of transformations include weather editing, partial or complete image synthesis, road surface manipulation, dynamic actor manipulation and combinations of these. The transformations can be chained.

Particularly, transformations of data are designed to increase the performance of models trained with such data and not necessarily to perfectly resemble natural/realistic images.

In other words, an abstract representation of the structure of a scene is used as guidance for generating visual training data that maximises performance of visual machine learning models trained on it. Maximising performance does not necessarily imply that data lies on the manifold of realistic/natural images.

Existing solutions focus on photorealism and not on generating maximally informative training data. The method focuses on generating the best training data, which may not follow the distribution of or lie on the manifold of natural/realistic images. This implies being able to gauge how informative the data is during the training process.

In contrast to conventional methods, the method according to the first aspect generates training data in silico, either directly or by leveraging simulation and composition in a simple space (e.g. semantic segmentation) and then synthesizing sufficiently realistic images from this representation—the aim is to synthesize the best training data for a given task or model—in many cases this can be accomplished by following a distribution other than that of natural images. Additionally, we enable composability of our transforms.

Additionally, the also transform/adapt real and synthetic data so that it follows a different distribution, e.g. day->night translation, again with the goal of obtaining the best training data.

Furthermore, the method may transform the structure of an existing (natural or synthetic) image directly. Examples of this include moving/removing/placing road actors (pedestrians, vehicles) and manipulating the road surface and structure (road markers, lanes etc), as described below.

Computer-Implemented Method

The method is computer-implemented, for example by a computer comprising a processor and a memory. Suitable computers are known.

The method is of generating training data (i.e. plurality c.f. datum: singular), for example for training a machine learning, ML, algorithm, for example according to the second aspect. The ML algorithm may be as described with respect to the second aspect.

Providing Representation of Environment

The method comprises providing the representation of the environment. Generally, a scenario comprises the environment having therein an ego-vehicle, a set of actors, including a first actor (i.e. at least one actor), and optionally a set of objects, including a first object. The environment, also known as a scene, typically includes one or more roads having one or more lanes and optionally, one or more obstacles, as understood by the skilled person. Generally, an ego-vehicle is a subject connected and/or automated vehicle, the behaviour of which is of primary interest in testing, trialling or operational scenarios. It should be understood that the behaviour of the ego-vehicle as defined by the control software (also known as AV stack) thereof. In one example, the first actor is a road user, for example a vehicle, a pedestrian or a cyclist. Other road users are known. In one example, the first object comprises and/or is infrastructure, for example traffic lights, or a static road user. In one example, the set of actors includes A actors wherein A is a natural number greater than or equal to 1, for example 1, 2, 3, 4, 5, 6, 7, 8, 9, 10 or more. In one example, the set of objects includes O objects wherein O is a natural number greater than or equal to 1, for example 1, 2, 3, 4, 5, 6, 7, 8, 9, 10 or more. In one example, the representation of the environment is an image, for example stored in a raw data formats (binary, bitmap, TIFF, MRC, etc.) or another image data formats (PNG, JPEG), encoded, a composite, defined by reference to other sub-images, a vector graphic, etc.

The representation of the environment has the defined structure and/or the defined geometry, and hence provides a ground truth. That is, the representation of the environment includes one or more roads having one or more lanes and optionally, one or more obstacles, as understood by the skilled person.

In one example, providing the representation of the environment comprises acquiring (also known as capturing), at least in part, the image of the environment. Hence, the representation of the environment may be partly synthesized and partly acquired, such as a mosaic.

In one example, providing the representation of the environment comprises semantically composing, at least in part, the image of the environment. Semantic composition is known. In this way, target environments such as including low-probability events may be composed semantically.

In one example, providing the representation of the environment comprises inpainting the image of the environment. In this way, the image may be rendered for training.

Generating Training Data

The method comprises generating the training data comprising the set of transformed representations, including a first transformed representation, of the environment by transforming the representation of the environment to the set of transformed representations, including the first transformed representation, of the environment. In one example, the set of transformed representations includes T transformed representations, wherein T is a natural number greater than or equal to 1, for example 1, 2, 3, 4, 5, 6, 7, 8, 9, 10, 20, 50, 100, 200, 500, 1,000, 2,000, 5,000, 10,000, 20,000, 50,000 or more. In this way, a substantial dataset for training may be provided. Transforming representations inter alia may be as described in https://arxiv.org/pdf/1907.11004.pdf, the subject matter of which is incorporated by reference in entirety herein.

In one example, generating the training data by transforming the representation of the environment to the set of transformed representations, including the first transformed representation, of the environment comprises generating the training data by transforming the representation of the environment to the set of transformed representations, including the first transformed representation, of the environment using a respective set of trained transforms (also known as adapters), including a first trained transform. In this way, generating of the training data is improved.

In one example, generating the training data by transforming the representation of the environment to the set of transformed representations, including the first transformed representation, of the environment comprises generating the training data by transforming the representation of the environment to the set of transformed representations, including the first transformed representation, of the environment using a respective set of heuristics-based transforms, including a first heuristics-based transform. Heuristics-based transforms are known.

In one example, generating the training data by transforming the representation of the environment to the set of transformed representations, including the first transformed representation, of the environment comprises generating the training data by transforming the representation of the environment to the set of transformed representations, including the first transformed representation, of the environment using a respective set of augmentations, including a first augmentations. Augmentations of images are known.

In one example, generating the training data by transforming the representation of the environment to the set of transformed representations, including the first transformed representation, of the environment comprises generating the training data by transforming the representation of the environment to the set of transformed representations, including the first transformed representation, of the environment using a respective set of conditions, including a first condition. In one example, the first condition is a weather condition (for example sun, rain, cloud, snow, mist, fog), a season condition (for example spring, summer, autumn, winter), a time condition (day, night), an illumination condition (bright sun, streetlights, headlights). In one example, the set of conditions includes C conditions, wherein C is a natural number greater than or equal to 1, for example 1, 2, 3, 4, 5, 6, 7, 8, 9, 10, 20, 50, 100, 200, 500 or more. In one example, transforming the representation of the environment to the set of transformed representations, including the first transformed representation, of the environment using a respective set of conditions, including a first condition, comprises using a plurality of conditions of the set thereof. In this way, conditions may be combined.

In one example, generating the training data by transforming the representation of the environment to the set of transformed representations, including the first transformed representation, of the environment comprises blending a set of representations of the environment. In this way, further representations of the environment may be generated inexpensively.

In one example, the first transformed representation of the environment has the defined structure and/or the defined geometry of the representation of the environment. In this way, the ground truth of the representation of the environment is maintained for the first transformed representation of the environment.

In one example, generating the training data by transforming the representation of the environment to the set of transformed representations, including the first transformed representation, of the environment comprises redefining the defined structure of the representation of the environment to a redefined structure of the first transformed representation of the environment. In this way, the ground truth of the representation of the environment is redefined, for example in a known way, for the first transformed representation of the environment.

Synthesizing Image of the Environment

Providing the representation of the environment comprises synthesizing, at least in part, the image of the environment using semantic information.

In one example, synthesizing, at least in part, the image of the environment using the semantic information comprises obtaining images or parts thereof corresponding to the semantic information from a database or by learning.

Method of Training ML Algorithm

The second aspect provides a computer-implemented method of training a machine learning, ML, algorithm, the method comprising:

generating training data comprising a set of transformed representations, including a first transformed representation, of an environment according to the first aspect; and training the ML algorithm comprising classifying the set of transformed representations according to a set of classes, including a first class.

In this way, the set of transformed representations are classified, for example for testing particular scenarios including the transformed representations of the environment.

Computer-implemented method

The method is computer-implemented, for example by a computer comprising a processor and a memory. Suitable computers are known.

The method is of training the ML algorithm.

Generating Training Data

The method comprises generating the training data comprising the set of transformed representations, including the first transformed representation, of the environment according to the first aspect.

Classifying Representations

The method comprises training the ML algorithm comprising classifying the set of transformed representations according to the set of classes, including the first class.

In one example, the set of classes, including the first class, is a set of conditions, including a first condition, for example as described with respect to the first aspect.

In one example, the method comprises identifying a set of characteristic (also known as intermediary) features, including a first characteristic feature, associated with the first condition.

In this way, characteristic or distinguishing features associated with the first condition may be identified and used for comparisons, such as to discover new conditions.

Method of Determining a Class

The third aspect provides a computer-implemented method of determining a class of a representation of an environment using a machine learning, ML, algorithm trained according to the second aspect, the method comprising:

determining the class of the representation of the environment comprising inferring the class of the representation of the environment using the trained ML algorithm.

Computer-Implemented Method

The method is computer-implemented, for example by a computer comprising a processor and a memory. Suitable computers are known.

The method is of determining the class of the representation of the environment, for example as described with respect to the second aspect.

Inferring Class of Representation

The method comprises determining the class of the representation of the environment comprising inferring the class of the representation of the environment using the trained ML algorithm, for example as described with respect to the second aspect.

In one example, the method comprises calculating a confidence score of the inferred class. For example, the calculated confidence may be used during testing.

In one example, the method comprises identifying a set of features, including a first feature, associated with a condition of the representation of the environment.

In one example, the method comprises comparing the identified set of features with a set of characteristic features associated with the condition of the representation of the environment.

In one example, the method comprises storing the representation of the environment based on a result of the comparing.

In one example, the method comprises training a transform using the stored representation of the environment.

In one example, the method comprises generating training data using the trained transform, for example according to the first aspect.

In one example, the method comprises training the ML algorithm using the generated training data.

In one example, the method comprises validating the ML algorithm using the generated training data.

In one example, the method comprises implementing an action based on a result of the comparing. In this way, a downstream task may be trained or tuned, for example, such as by selecting parameters thereof.

Method of Testing

A fourth aspect provides a computer-implemented method of testing, for example installation, assurance, validation, verification, regression and/or progression testing of the ego-vehicle, for example of the control software thereof, the method comprising:

generating training data according to the first aspect;

simulating a scenario comprising the first transformed representation of the environment having therein an ego-vehicle, a set of actors, including a first actor, and optionally a set of objects, including a first object, wherein simulating the first scenario comprises; and identifying a defect of the ego-vehicle in the scenario.

Computer, Computer Program, Non-Transient Computer-Readable Storage Medium

The fifth aspect provides a computer comprising a processor and a memory configured to perform a method according to the first aspect, the second aspect, the third aspect and/or the fourth aspect.

The sixth aspect provides a computer program comprising instructions which, when executed by a computer comprising a processor and a memory, cause the computer to perform a method according to the first aspect, the second aspect, the third aspect and/or the fourth aspect.

The seventh aspect provides a non-transient computer-readable storage medium comprising instructions which, when executed by a computer comprising a processor and a memory, cause the computer to perform a method according to the first aspect, the second aspect, the third aspect and/or the fourth aspect.

Definitions

Throughout this specification, the term “comprising” or “comprises” means including the component(s) specified but not to the exclusion of the presence of other components. The term “consisting essentially of” or “consists essentially of” means including the components specified but excluding other components except for materials present as impurities, unavoidable materials present as a result of processes used to provide the components, and components added for a purpose other than achieving the technical effect of the invention, such as colourants, and the like.

The term “consisting of” or “consists of” means including the components specified but excluding other components.

Whenever appropriate, depending upon the context, the use of the term “comprises” or “comprising” may also be taken to include the meaning “consists essentially of” or “consisting essentially of”, and also may also be taken to include the meaning “consists of” or “consisting of”.

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIGS. 11A to 11D show examples of images;

DETAILED DESCRIPTION OF THE DRAWINGS

Generally, FIGS. 1 to 14 schematically depict a computer-implemented method of generating training data, as described with respect to the first aspect, the method comprising:

providing a representation of an environment, wherein the representation of the environment has a defined structure and/or a defined geometry; and generating the training data comprising a set of transformed representations, including a first transformed representation, of the environment by transforming the representation of the environment to the set of transformed representations, including the first transformed representation, of the environment;

wherein providing the representation of the environment comprises synthesizing, at least in part, an image of the environment using semantic information.

Figure 1:
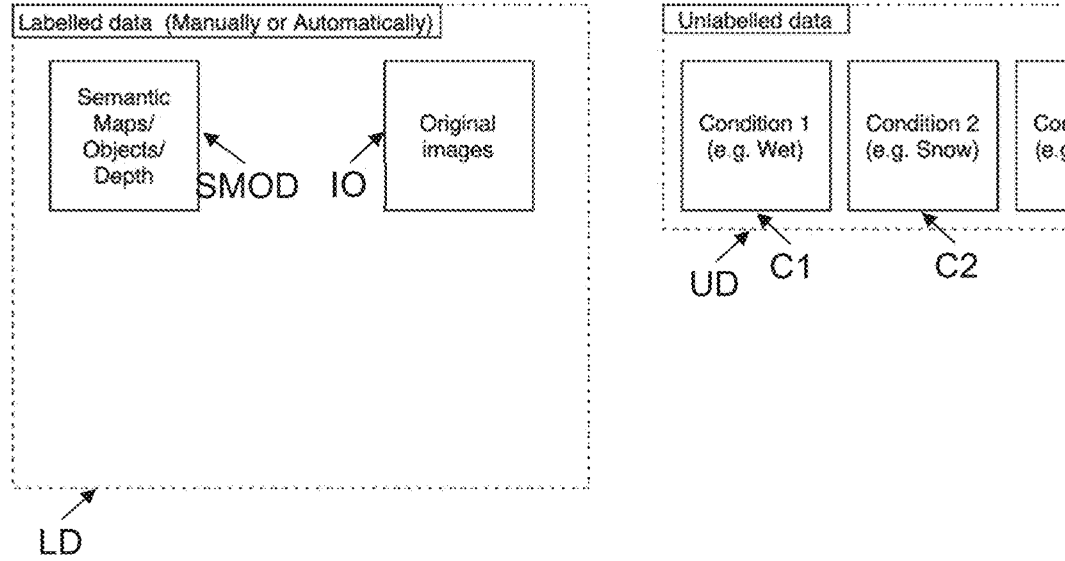
FIG. 1 schematically depicts a method according to an exemplary embodiment, in detail.

FIG. 1 schematically depicts a method according to an exemplary embodiment, in detail.

Particularly, FIG. 1 shows a corpus 1 comprising labelled data DL, wherein the data are manually or automatically labelled, and unlabelled data DU. The labelled data DL include original images IO of an environment and the respective Semantic Maps/Object locations/Depth SMOD thereof. The unlabelled data DU include a set of conditions, including a first condition C1 (e.g. wet), a second condition C2 (e.g. snow) and third condition C3 (e.g. night).

Figure 2:
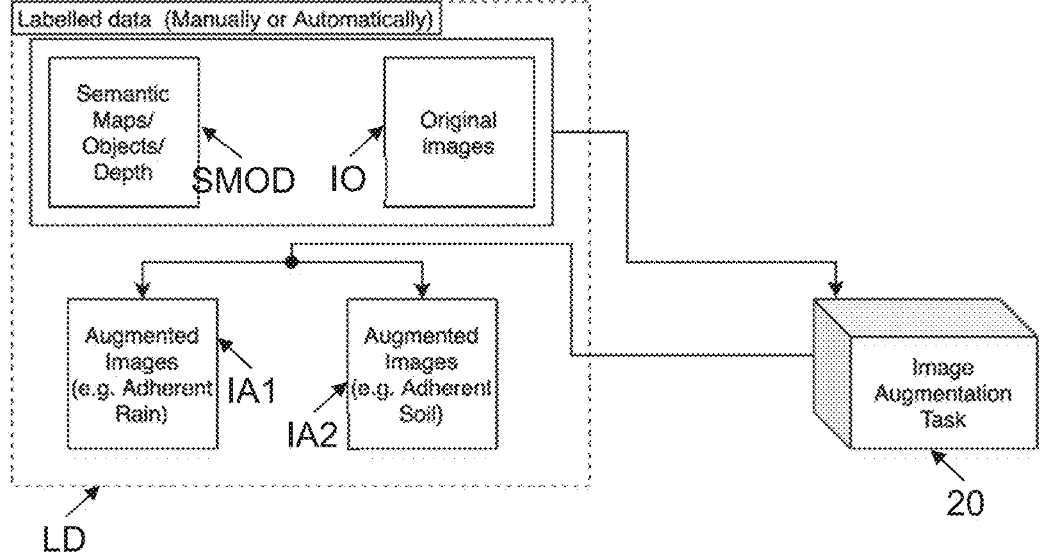
FIG. 2 schematically depicts a method to an exemplary embodiment, in detail.

FIG. 2 schematically depicts a method 2 according to an exemplary embodiment, in detail.

In this example, generating the training data by transforming the representation of the environment to the set of transformed representations, including the first transformed representation, of the environment comprises generating the training data by transforming the representation of the environment to the set of transformed representations, including the first transformed representation, of the environment using a respective set of conditions, including a first condition.

In this example, generating the training data by transforming the representation of the environment to the set of transformed representations, including the first transformed representation, of the environment optionally comprises generating the training data by transforming the representation of the environment to the set of transformed representations, including the first transformed representation, of the environment using a respective set of trained transforms (also known as adapters), including a first trained transform.

In this example, generating the training data by transforming the representation of the environment to the set of transformed representations, including the first transformed representation, of the environment optionally comprises generating the training data by transforming the representation of the environment to the set of transformed representations, including the first transformed representation, of the environment using a respective set of heuristics-based transforms, including a first heuristics-based transform . . .

In one example, generating the training data by transforming the representation of the environment to the set of transformed representations, including the first transformed representation, of the environment optionally comprises generating the training data by transforming the representation of the environment to the set of transformed representations, including the first transformed representation, of the environment using a respective set of augmentations, including a first augmentations.

With reference to FIG. 2, data expansion may be performed by performing an image augmentation task 20. The image augmentation task 20 may be carried out using a generative adversarial agent (GAN). The original images IO and semantic maps/objects/depth SMOD are inputs to the GAN. The GAN is trained to output augmented images based on the original images. The augmented images IA1, IA2, may be the original images IO augmented with a condition e.g. adherent rain IA1 or adherent soil IA2. Because the structure of the augmented images IA1, IA2 is the same as the original images, the ground truths, e.g. the semantic maps, object locations, depth etc., are still valid.

The semantic maps, object locations, depths SMOD, original images IO, augmented images IA1, IA2, may be labelled data. In this way, training the GAN may be supervised. Therefore, the GAN may be trained to augment an original image with one or more conditions. The conditions may include weather conditions, lighting conditions, etc.

Figures 3A, 3B, 3C:
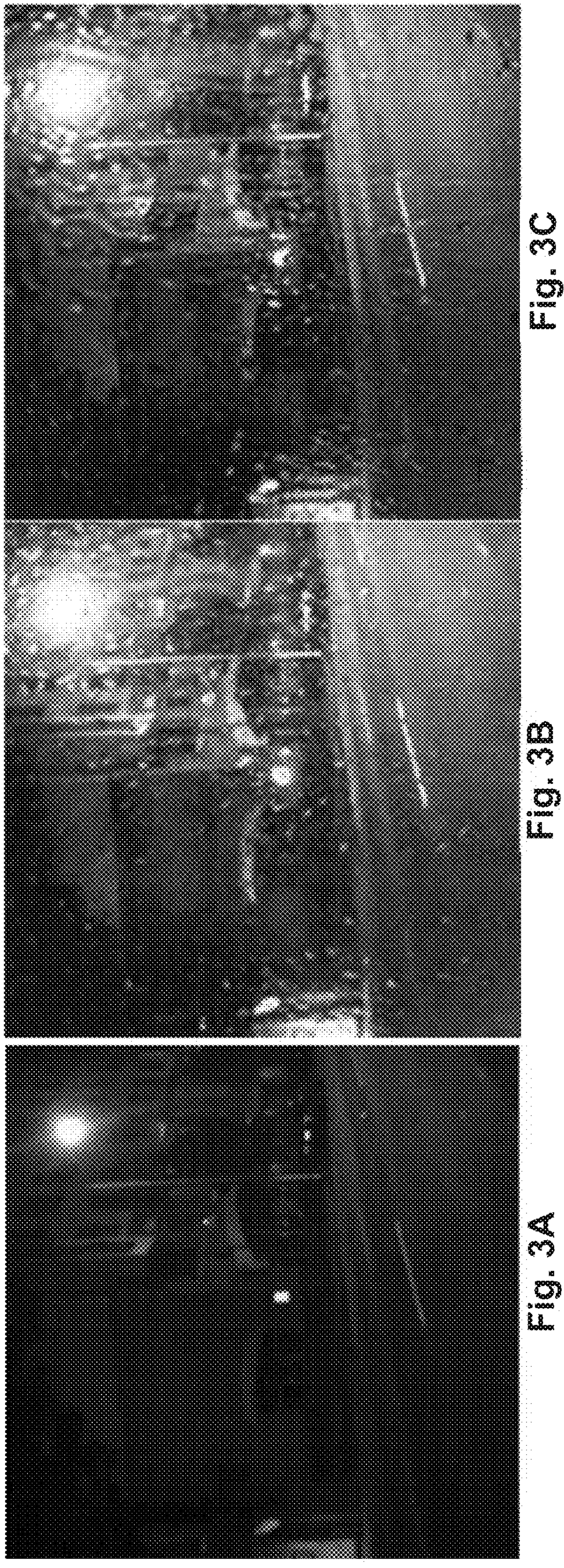
FIGS. 3A to 3C show examples of images.

FIG. 3A shows an original image, FIG. 3B shows an augmented image (adherent rain) and FIG. 3C shows an augmented image (adherent rain), generated by the method described with respect to FIG. 2. The respective ground-truths are valid for the original or augmented images with the conditions (FIGS. 3B and 3C).

Figure 4:
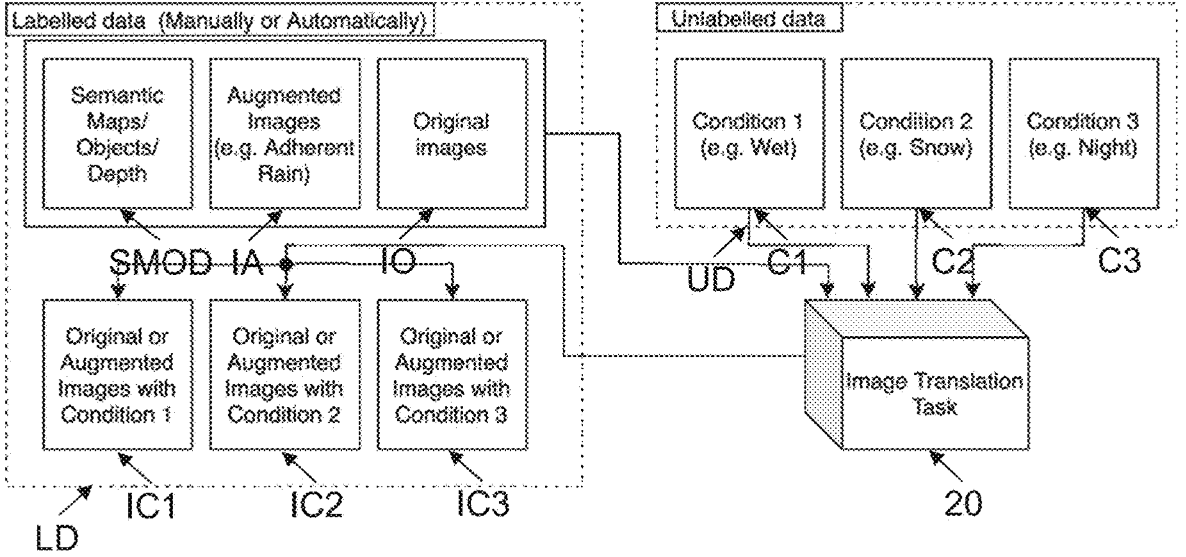
FIG. 4 schematically depicts a method to an exemplary embodiment, in detail.

FIG. 4 schematically depicts a method of generating training data examples.

Particularly, FIG. 4 shows expansion 4 of the labelled data DL using an unpaired translation method. The image translation method may be an image translation task 20. The image translation task may translate images using a cycle-consistency GAN to a different domain. More specifically, semantic maps, object locations, and depths SMOD, plus augmented images IA generated from the method using the method of FIG. 2, and original images Ol, are input to the cycleGAN. Various conditions, e.g. condition 1 (e.g. wet) C1 condition 2 (e.g. snow) C2, condition 3 (e.g. night) C3, in the form of unlabelled data may be input to the cycleGAN. Due to the condition data being unlabelled, the cycleGAN is trained in an unsupervised manner. The cycleGAN may be trained to output original or augmented images translated to a different condition, e.g. condition 1 C1, condition 2 C2, or condition 3 C3. The original or augmented images translated to a different condition IC1, IC2, IC3, may be called translated images. The translated images IC1, IC2, IC3, may retain the respective structures of the original images IO or augmented images IA and thus the respective ground truths (semantic maps, object locations, depths) may still be valid.

Figures 5A, 5B, 5C, 5D:
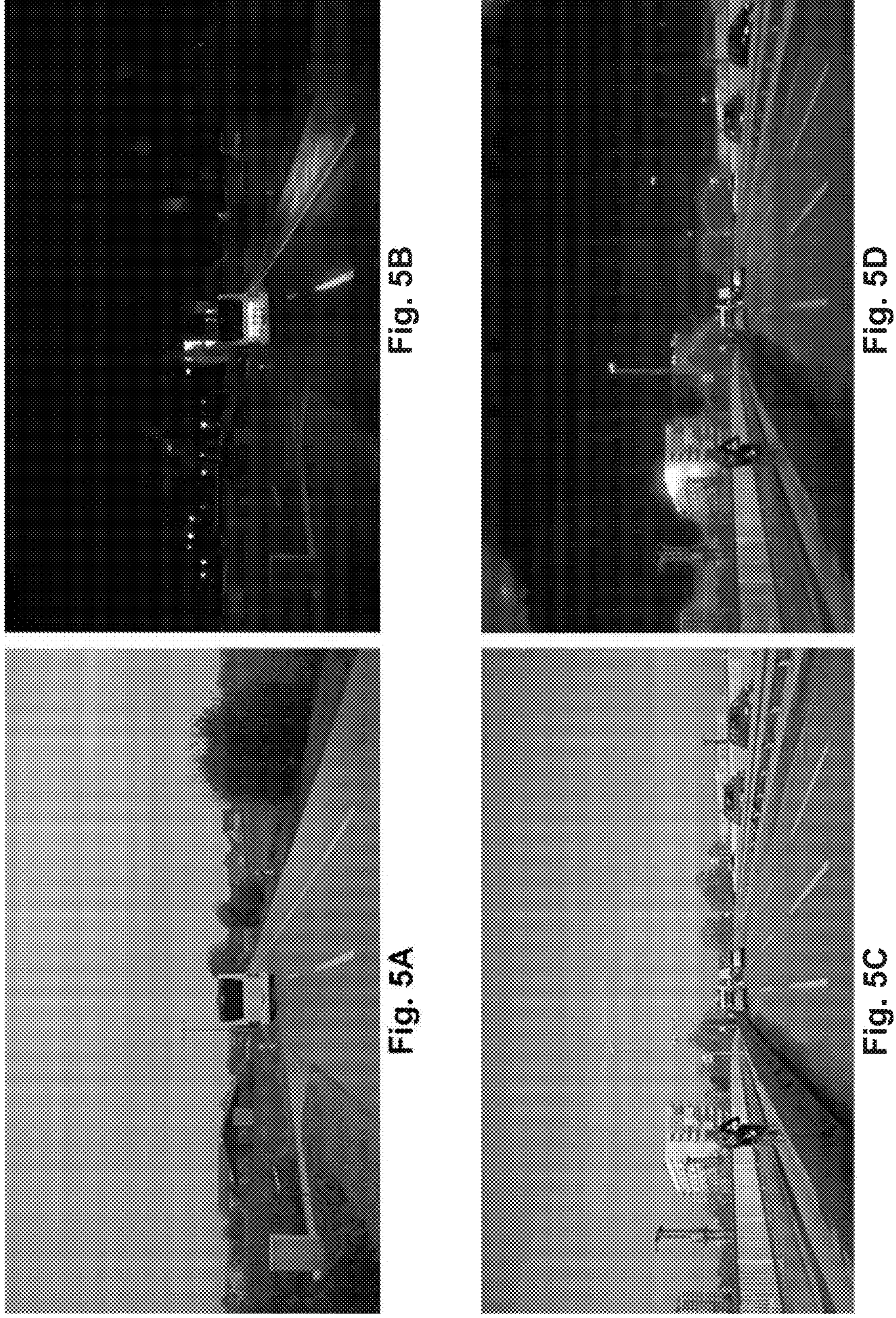
FIGS. 5A to 5D show examples of images.

FIGS. 5A and 5C illustrate examples of original images IO and FIGS. 5B and 5D illustrate examples of translated images IC1, IC2, generated using the cycleGAN from FIG. 4. The illustrative examples of the translated images in FIGS. 5B and 5D have been generated by translating the original images IO from FIGS. 5A and 5C with a night-time condition, e.g. low lighting level with lights being artificial lights e.g. from street lamps, buildings, vehicles, etc.

The original image IO of FIG. 5A shows a rural single carriageway, including a coach, during day-time. FIG. 5B shows a translated image IC1 of a rural single carriageway, including a coach, during night-time.

The original image IO of FIG. 5C shows an urban dual carriageway, including cars and a cyclist, during day-time. FIG. 5D shows a translated image IC2 of an urban dual carriageway, including cars and a cyclist, during night-time. The respective ground-truths are valid for the original or augmented images with the conditions (FIGS. 5B and 5D).

It should be noted that a discrete cycleGAN model trained with reference to FIGS. 4, and 5A to 5D, may be trained with respect to a single condition, e.g. day time or night time. In this way, it may be necessary to train a plurality of discrete cycleGAN models, one for each known condition, in order to generate training data translated with each of the known conditions.

Figure 6:
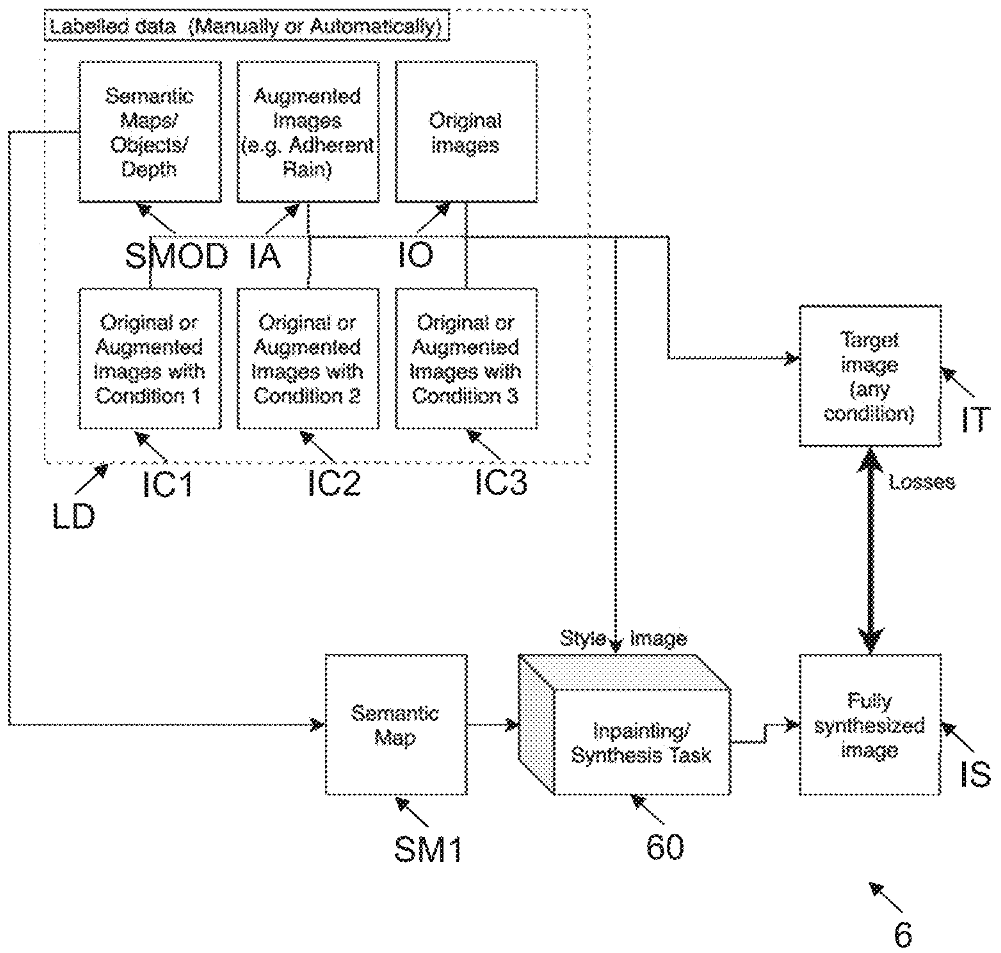
FIG. 6 schematically depicts a method to an exemplary embodiment, in detail.

FIG. 6 schematically depicts a method of generating synthesized training data. More specifically, FIG. 6 shows a method of generating synthesized training images based on semantic maps.

In this example, providing the representation of the environment comprises inpainting the image of the environment.

With reference to FIG. 6, an inpainting and/or synthesis task 60 is carried out. The inpainting and/or synthesis task may be carried out by an inpainting model or a synthesis model, which may take the form of a GAN, a cycle-consistency GAN, or an autoencoder AE such as a variational autoencoder VAE. Other models may also be used, including vision transformers, diffusion models, etc.

The inpainting model or synthesis model may receive a semantic map SM1. The inpainting model or synthesis model may receive an image. The image may be any of an original image IO, an augmented image IA, or a translated image IC1, IC2, IC3. The inpainting model or the synthesis model may be trained to generate a synthesized image IS based on the features from the semantic map SM1 in the style of the received image. A loss is determined between the synthesized image IS and a target image IT. The target image IT may be the image received by the inpainting model or the synthesis model. In this way, the target image IT may be the original image IO, the augmented image IA, or the translated image IC1, IC2, IC3. The parameterisation of the inpainting model or the synthesis model may be changed, or optimised, to reduce, or minimise, the loss between the synthesized image IS and the target image IT.

Figures 7A, 7B, 7C, 7D:
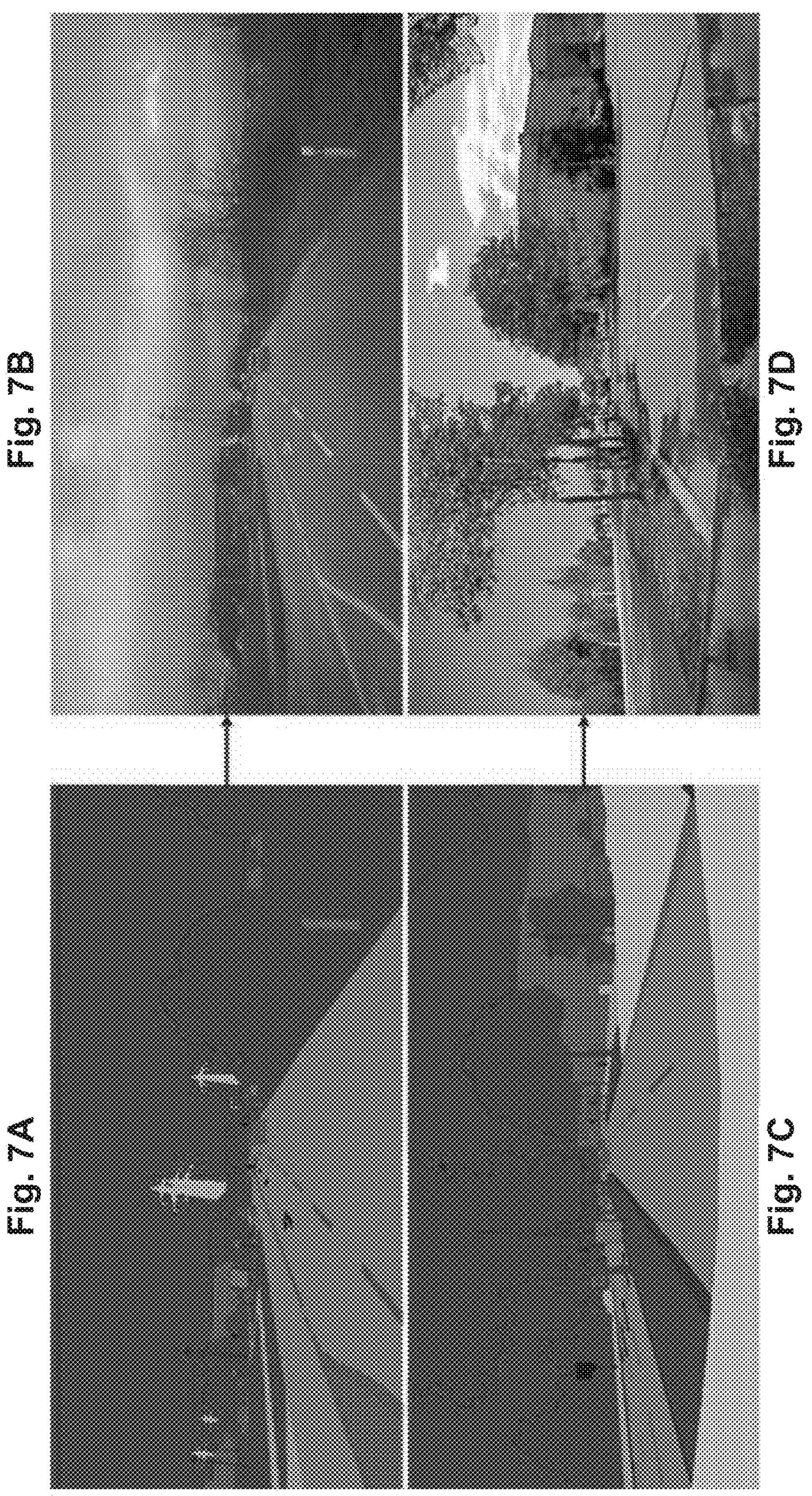
FIGS. 7A to 7D show examples of images.

FIGS. 7A and 7C show semantic maps SM1. FIGS. 7B and 7D show synthesized images IS generated using the synthesis model trained according to the method of FIG. 6.

FIG. 7A shows a semantic map SM1 of a rural carriageway, including a car. FIG. 7B shows a synthesized image IS of the rural carriageway, including a car, and during day time. In other words, FIG. 7B shows an image in the style of the image received by the synthesis model showing the features from the semantic map SM1 of FIG. 7A.

FIG. 7C shows a different semantic map SM1 of a suburban single carriageway, including no other vehicles but including trees and buildings. FIG. 7D shows a synthesized image IS of the suburban single carriageway, including no other vehicles, but including trees and buildings according to the semantic map SM1, during the day-time.

Figure 8:
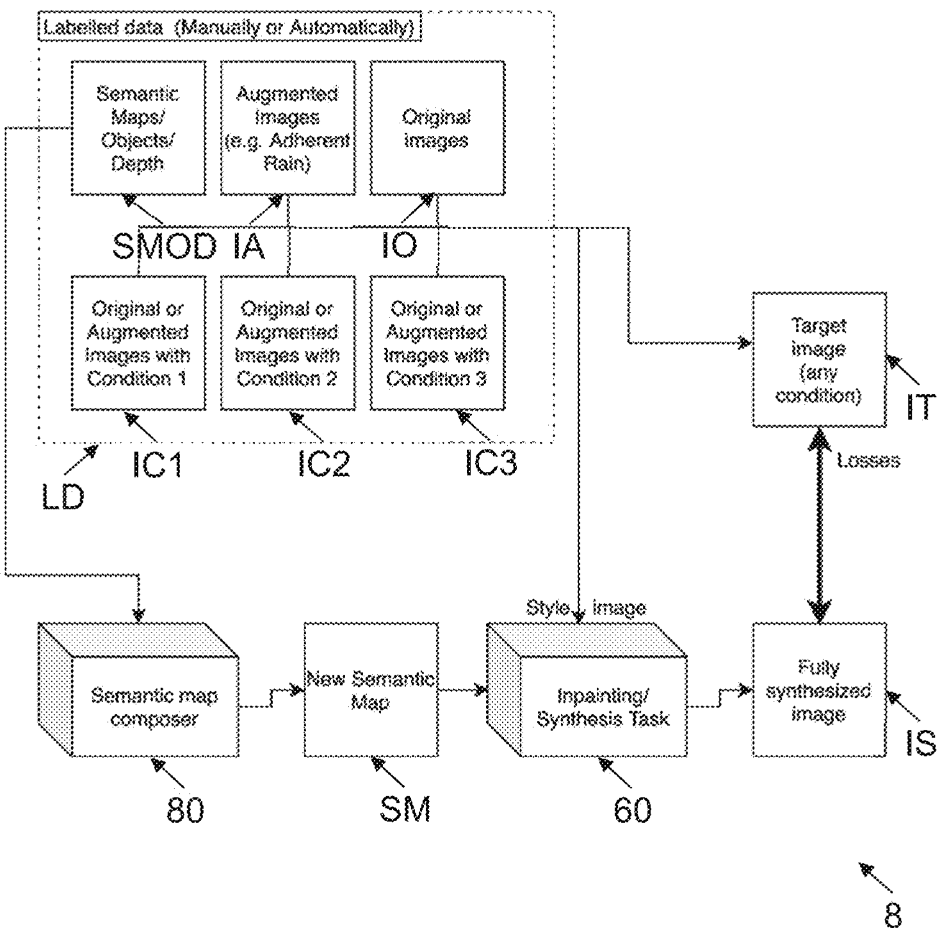
FIG. 8 schematically depicts a method to an exemplary embodiment, in detail.

FIG. 8 schematically depicts a method of generating training images from semantic maps.

In this example, providing the representation of the environment comprises semantically composing, at least in part, the image of the environment.

The method of FIG. 8 works in the same way as the method of FIG. 6 with the addition of a semantic map composer 80. The semantic map composer 80 may be a semantic map composer model and may include a GAN, a cycle-consistency GAN, or an AE such as a VAE. Other models may also be used including vision transformers, diffusion models, etc.

The semantic map composer model may be trained to generate new semantic maps SM by combining a features from a plurality of semantic maps from the corpus of labelled data LD.

Figures 9A, 9B, 9C, 9D:
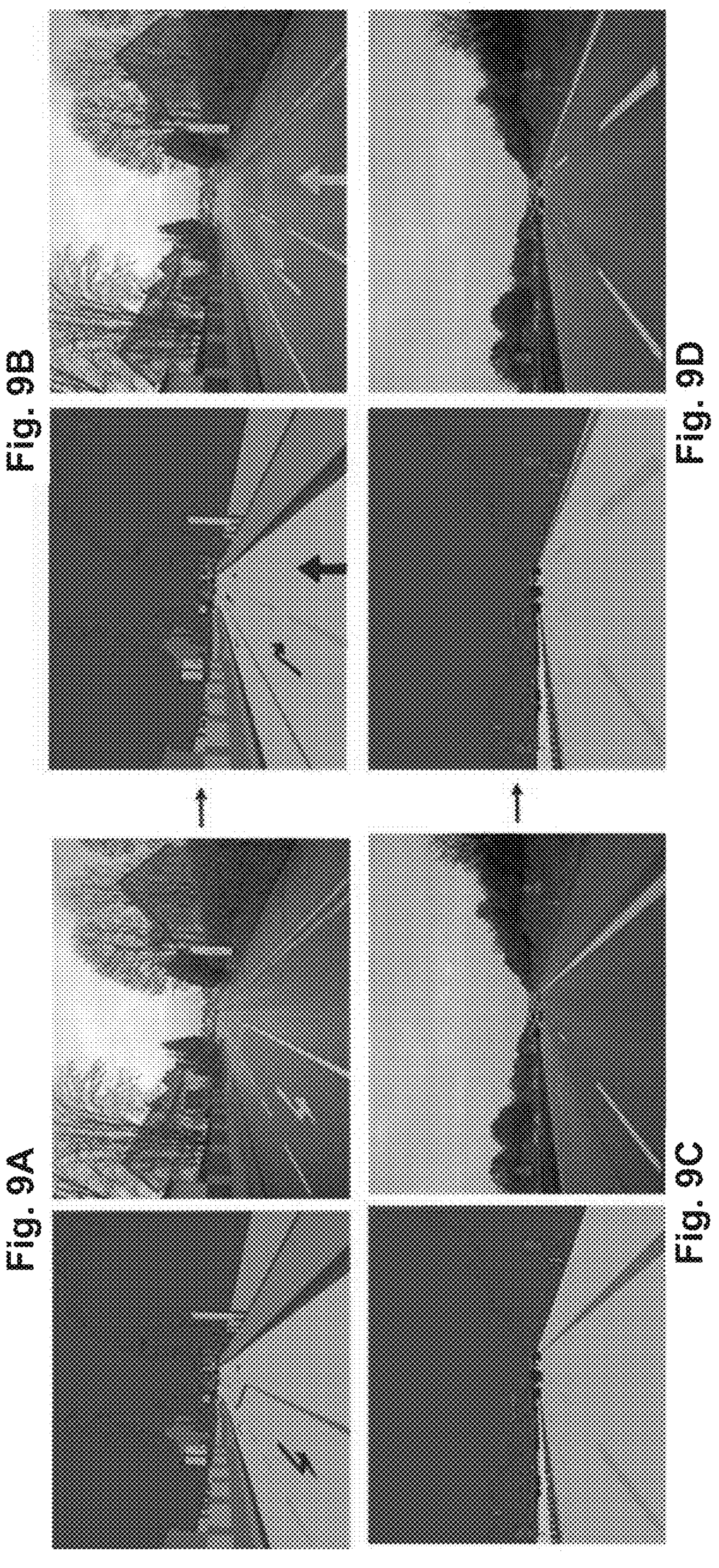
FIGS. 9A to 9D show examples of images.

FIGS. 9A and 9C show pairs of semantic maps SM1 and synthesized images resulting from using the synthesis model where the semantic maps SM1 are semantic maps from the labelled data LD corpus. FIGS. 9B and 9D show pairs of new semantic maps SM generated by the semantic map composer model based on the semantic maps of FIGS. 9A and 9C, respectively. The new semantic maps SM show the same roads as in the respective semantic maps SM1 but with different road markings. In each case, the semantic map SM1 or the new semantic map SM is used by the synthesis model to generate images in the style of the received image.

The respective ground-truths are valid for the original or augmented images with the conditions (FIGS. 9B and 9D).

Figure 10:
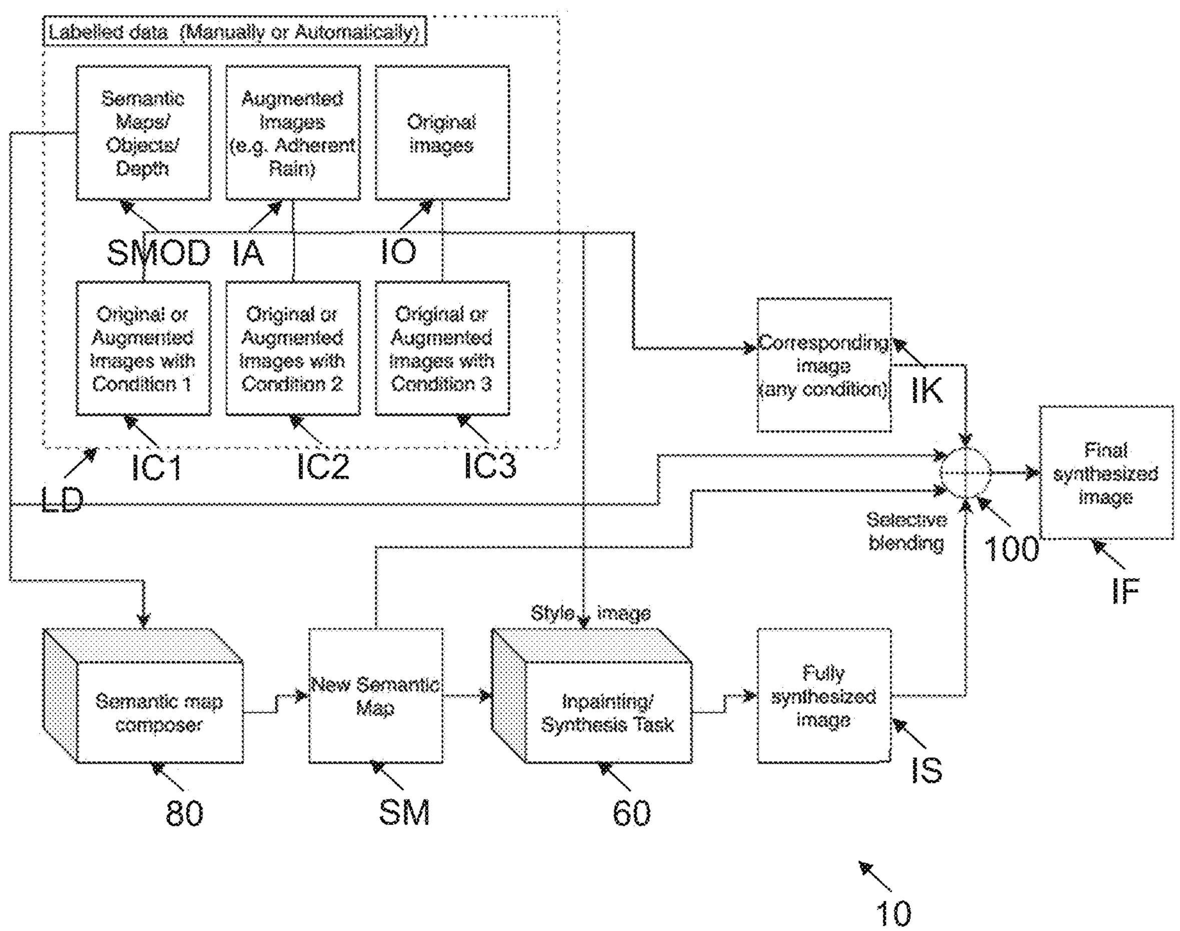
FIG. 10 schematically depicts a method to an exemplary embodiment, in detail.

FIG. 10 schematically depicts a method of according to an exemplary embodiment, in detail, generally as described with respect to FIG. 8.

In this example, generating the training data by transforming the representation of the environment to the set of transformed representations, including the first transformed representation, of the environment comprises blending a set of representations of the environment.

Particularly, FIG. 10 shows expansion 10 of the labelled data DL to generate a final synthesized image IF derived from the semantic segmentation map SMn by combining or blending directly with any other image IK (real, augmented or synthesized) that corresponds to that semantic segmentation map SMn to generate distilled and diverse data to accelerate training of other tasks. Original or augmented images IC1 (with the first condition C1), IC2 (with the second condition C2) and IC3 (with the third condition C3), included in the labelled data LD, similarly retain the respective structures of the original images IO and the augmented images IA and thus the respective ground-truths (Semantic Maps/Object locations/Depth SMOD) are still valid for the original or augmented images with the conditions IC1, IC2, IC3.

FIG. 11A shows an original image (urban intersection, cars, summer, buildings), FIG. 11B shows an augmented image with a condition (urban intersection, cars, winter, trees), FIG. 11C shows an original image (urban intersection, cars, ⅛ cloud, buildings) and FIG. 11D shows an augmented image with a condition (urban intersection, cars, ⅞ cloud, trees), generated by the method described with respect to FIG. 10. The respective ground-truths are valid for the original or augmented images with the conditions (FIGS. 11B and 11D).

Figure 12:
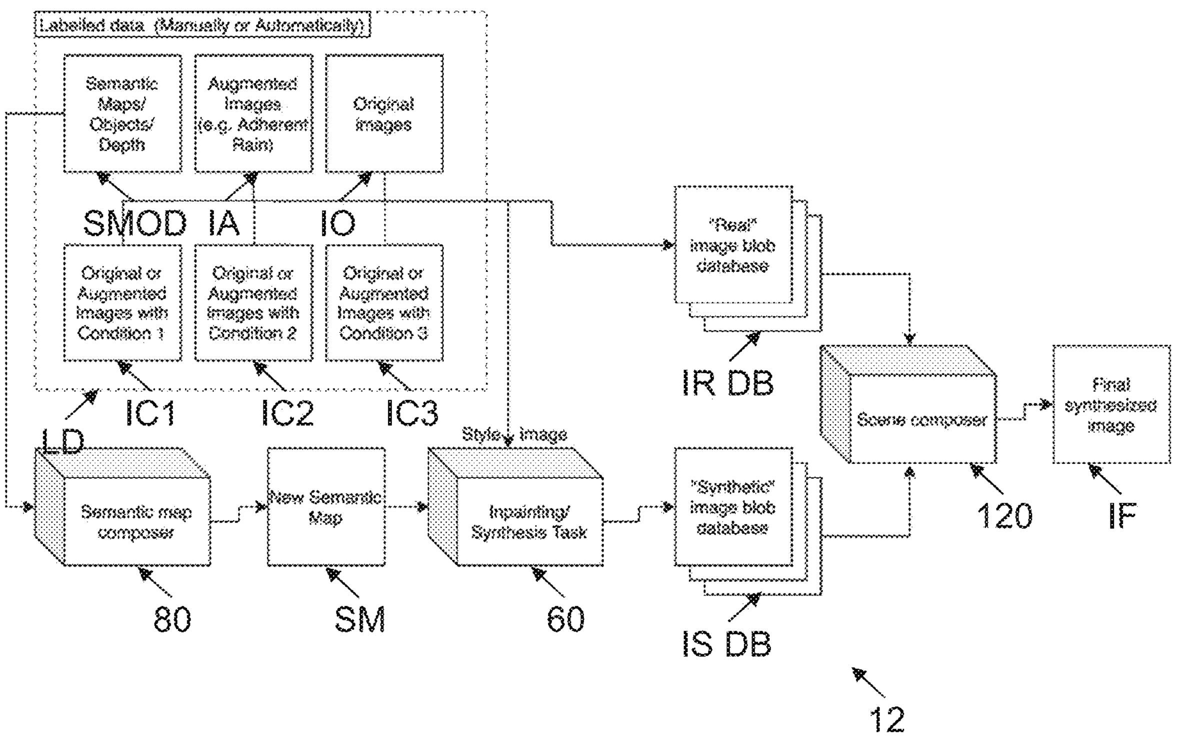
FIG. 12 schematically depicts a method to an exemplary embodiment, in detail.

FIG. 12 schematically depicts a method of according to an exemplary embodiment, in detail.

In this example, synthesizing, at least in part, the image of the environment using the semantic information comprises obtaining images or parts thereof corresponding to the semantic information from a database.

Particularly, FIG. 12 shows real, augmented or synthesized images (with or without a common segmentation map) can be decomposed into building blocks (referred to as blobs) using their segmentation maps. Multiples of the blobs can be formed into blob databases ("real" image blob database IR DB and ("synthetic" image blob database IS DB. A scene composer 120 is used to combine blobs from the multiple databases IR DB, IS DB into new synthesized images IF and segmentation maps.

Figures 13A, 13B, 13C, 13D:
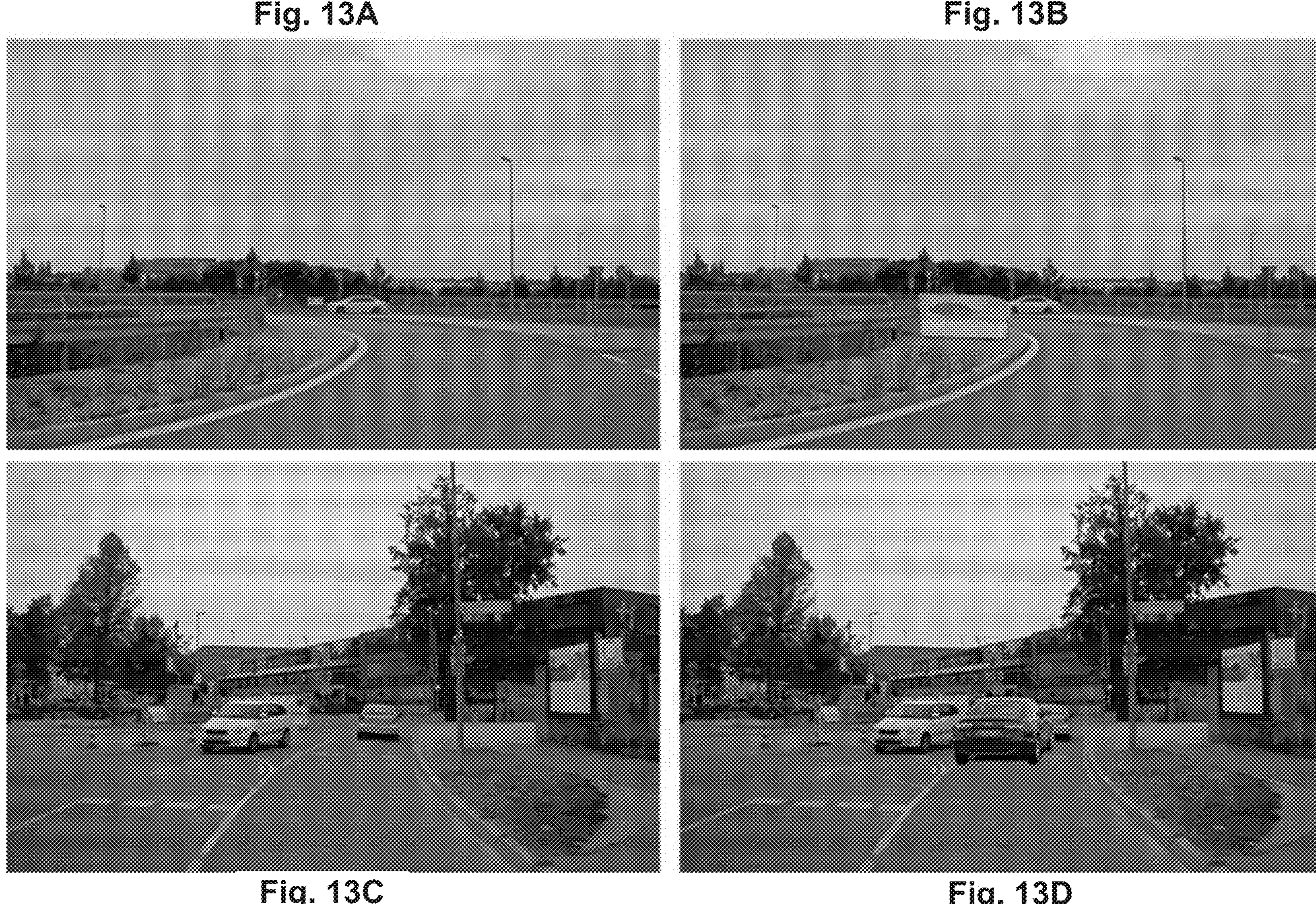
FIGS. 13A to 13D show examples of images.

FIG. 13A shows an original image, FIG. 13B shows an augmented image with a blob, e.g. a loading platform storing rubble. FIG. 13C shows an original image and FIG. 13D shows an augmented image with a blob, e.g. a car, generated by the method described with respect to FIG. 12. The respective ground-truths are valid for the original or augmented images with the conditions (FIGS. 13B and 13D).

Figures 14A, 14B, 14C, 14D, 14E, 14F:
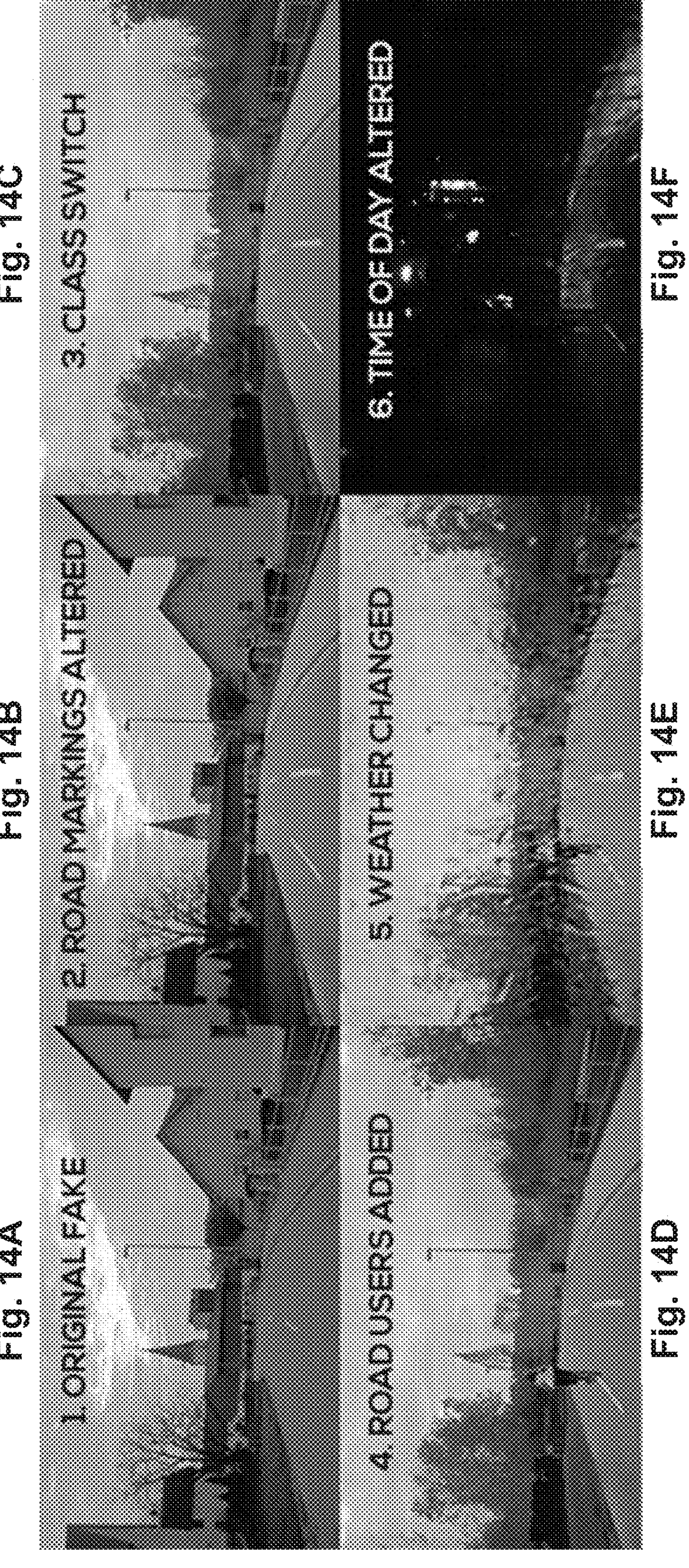
FIGS. 14A to 14F show examples of transformations.

FIGS. 14A to 14F shows examples of the above transformations applied in a chained fashion to yield new conditions, appearances, structures and training data. FIG. 14A shows an original fake (suburban, two lanes, ⅞ cloud, winter, day), FIG. 14B shows altered road markings (three lanes), FIG. 14C additionally shows a class switch (autumn), FIG. 14D additionally shows road users added (cyclist), FIG. 14E additionally shows condition (e.g. weather) changed (rain) and FIG. 14F additionally shows time of day altered (night).

As described above, the final synthetic image may be part-synthesized and part-real (as shown in FIGS. 10 to 13D).

As described above, the final synthetic image may be derived from an abstract representation (e.g. semantic map or bounding boxes, FIGS. 6 to 7D) and/or may be the result of a transform on another image (FIGS. 2 to 5D).

As understood by the skilled person, the image synthesizer network (e.g. SPADE in this particular example) is swappable for other architectures.

The processes depicted above may be applied potentially in an online (on-vehicle, on-platform) fashion, to improve downstream tasks in real-or near real-time, as the vehicle/platforms explores new, changing or unseen domains.

Figure 15:
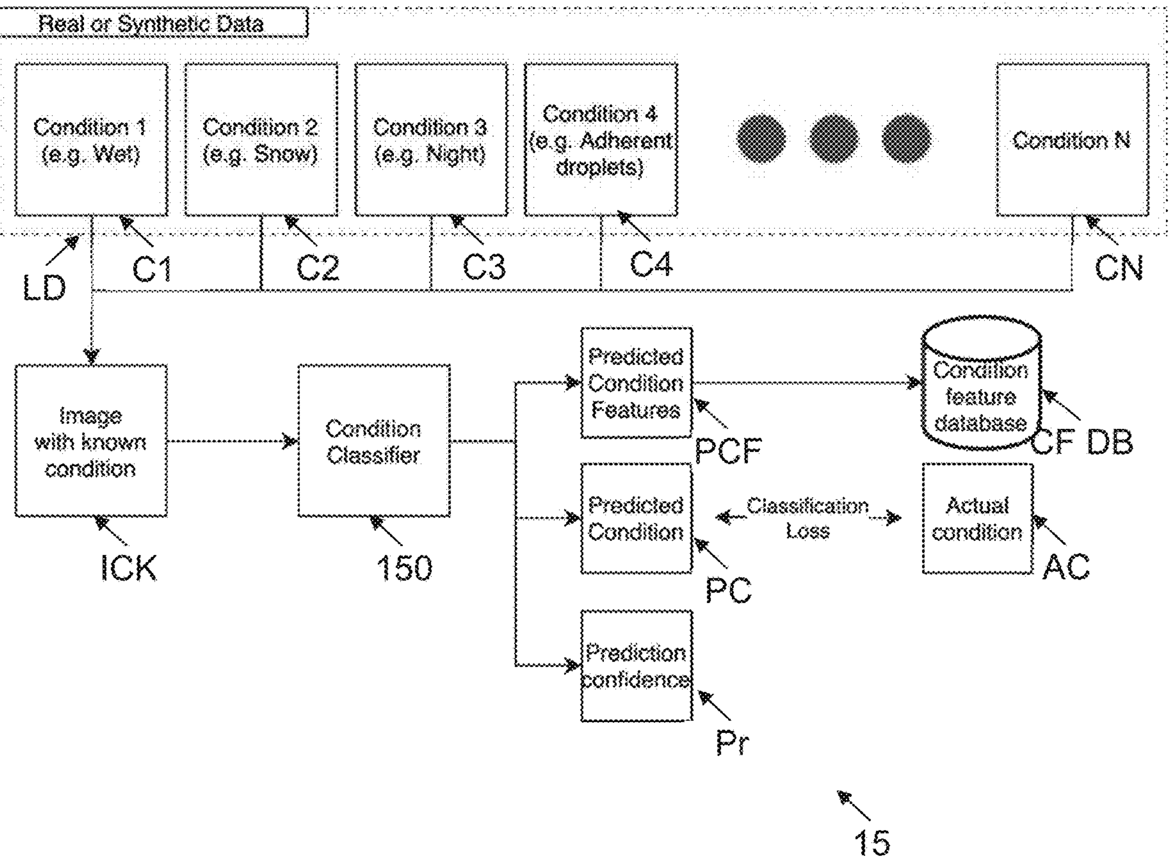
FIG. 15 schematically depicts a method to an exemplary embodiment, in detail.
Figure 16:
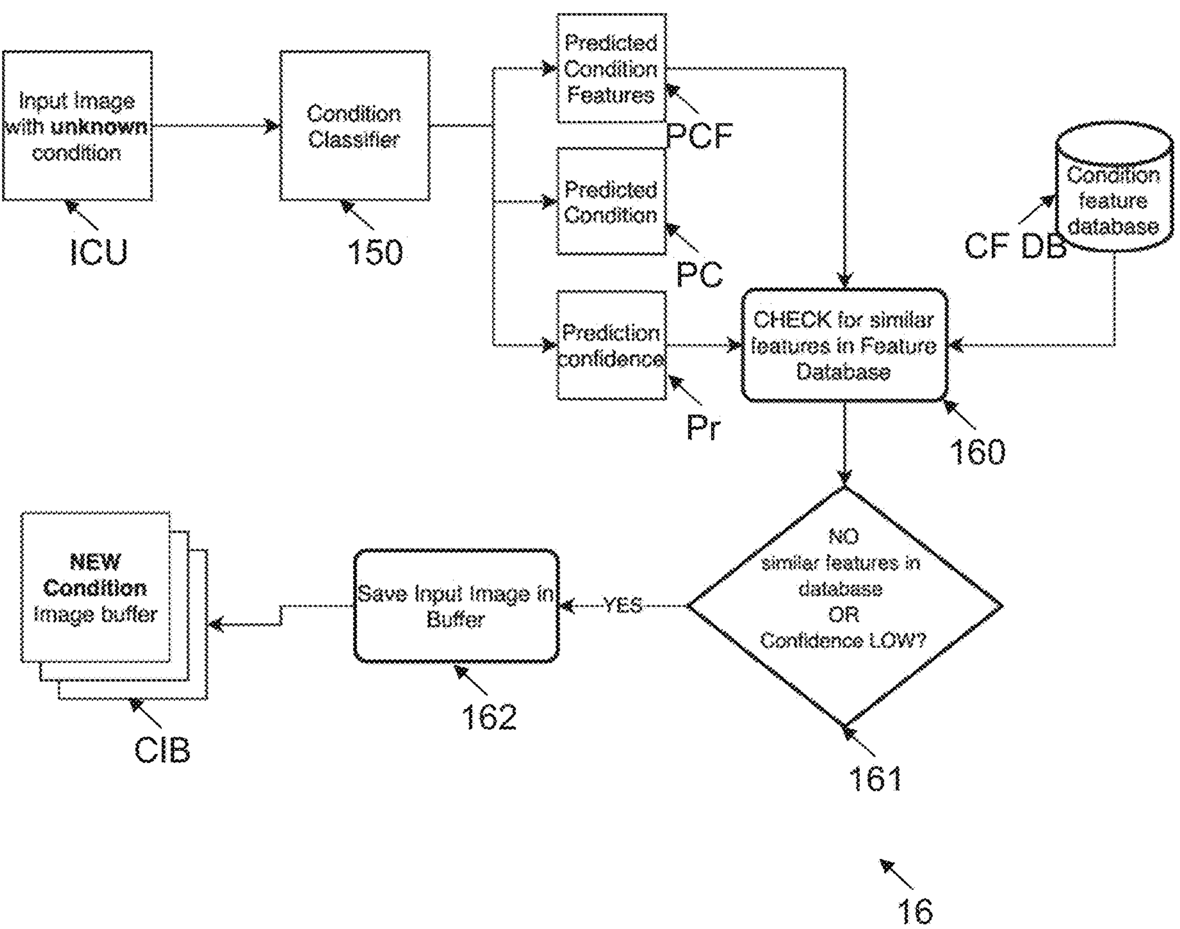
FIG. 16 schematically depicts a method to an exemplary embodiment, in detail.
Figure 17:
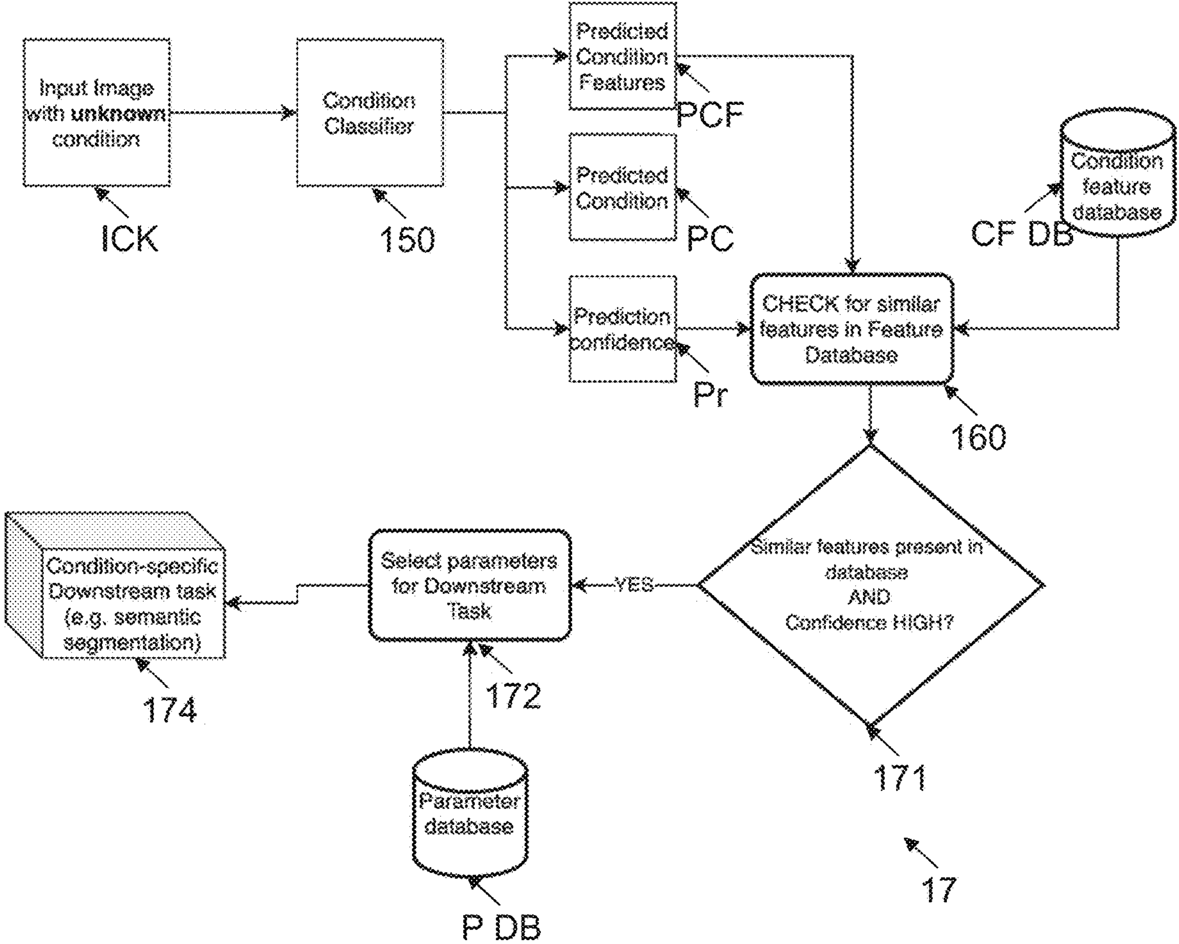
FIG. 17 schematically depicts a method to an exemplary embodiment, in detail.

Generally, FIGS. 15 to 17 schematically depict a computer-implemented method of training a machine learning, ML, algorithm, as described with respect to the second aspect, the method comprising:

- generating training data comprising a set of transformed representations, including a first transformed representation, of an environment according to the first aspect; and training the ML algorithm comprising classifying the set of transformed representations according to a set of classes, including a first class.

FIG. 15 schematically depicts a method 15 of according to an exemplary embodiment, in detail. More particularly, FIG. 15 schematically depicts a method of determining a condition of an image.

Particularly, a condition classifier 150 is trained to detect and classify the condition or appearance of input data (i.e. image with known condition) ICK. The condition classifier 150 may be a neural network. The condition classifier 150 is trained to reduce, or minimise, a classification loss between a predicted condition PC and an actual condition AC. The actual condition AC is a known condition and is the condition associated with the input data ICK.

Additionally, condition-specific intermediary features (predicted condition features PCF) emitted or produced as part of the operation of the condition classifier 150 may be saved in a database CF DB. The term "features" may be used in this context to mean an activation, or an output from an activation function from within the neural network. There may be a plurality of predicted condition features, each associated with a respective output of an activation function of each node within the neural network. In this way, all activation outputs may be stored as predicted condition features PCF. The predicted condition features PCF may be stored in a database called a condition feature database CF DB.

The condition classifier 150 may optionally emit a confidence score Pr for the prediction. The predicted confidence Pr may be a probability of an output layer of the neural network that the condition of the obtained image is one of one or more unknown conditions of images. For example, where a softmax output layer is used, the probability associated with each node of the output layer is taken as the predicted confidence Pr.

In this example, the image with known condition ICK is generated using a set of conditions, including a first condition C1 (e.g. wet), a second condition C2 (e.g. snow), a third condition C3 (e.g. night), a fourth condition C4 (e.g. adherent droplets) . . . an Nth condition included in the labelled data LD (real or synthetic data).

FIG. 16 schematically depicts a method 16 of according to an exemplary embodiment, in detail, generally as described with respect to the method 15, repetition of which is omitted, for brevity. More specifically, FIG. 16 schematically depicts a method of identifying a new condition.

In FIG. 16, an input image ICU with an unknown condition is obtained by one or more image sensors of the autonomous vehicle. The obtained image ICU is applied to the condition classifier 150. The condition may be a condition such as a weather state, a time of day, a lighting condition, etc. The condition classifier 150 is configured to output predicted condition features PCF, a predicted condition PC, and a predicted confidence Pr based on the input image ICU.

Next, the method comprises checking for similar features in the condition features database CF DB. At 161 if either the prediction confidence Pr is low, e.g. below a confidence threshold, or there are no similar features in the database, the condition is determined to be a new condition. The new condition is saved at 162 in the new condition image buffer CIB.

For example, a known condition may be 100% light, e.g. day time, and another known condition may be 0-20% light, e.g. night time. If an input image ICU is captured by a camera on an autonomous vehicle during evening time, e.g. 50% light, the prediction condition features PCF will not represent prediction condition features PCF for either of the known conditions. Any suitable matcher may be used to compare the condition features for the input image ICU and those of a known condition.

FIG. 17 schematically depicts a method 17 of according to an exemplary embodiment, in detail, generally as described with respect to the method 16, repetition of which is omitted, for brevity.

More specifically, FIG. 17 schematically depicts a method 17 of performing a condition-specific downstream task, e.g. semantic segmentation, object detection, object recognition, etc.

The method 17 is the same as method 16 up to and including checking for similar features in features database at 160.

Then, at 171, if there are similar features in the condition features database CF DB, and the prediction confidence Pr is above a threshold, at 172 the parameters are selected from a parameter feature database P DB. The parameters may be the parameters of a specific machine learning model used for the downstream task. For example, the parameters may include weights of a neural network. The parameters are determined when training the machine learning model to perform the specific downstream task. For example, a model trained using 100% light condition to perform semantic segmentation will have certain weights. A method trained using 20% light condition to perform semantic segmentation will have different weights. Therefore, there may be a plurality of parameterisations for semantic segmentation models, one discrete parameterisation for each condition the model was trained using.

Upon retrieval of the parameterisation, the specific downstream task may be performed, e.g. the image may be parameterised.

To do this, the method may further comprise comparing the prediction confidence to a confidence threshold; and determining a degree of similarity between the one or more predicted confidence features and one or more respective confidence features of a known condition.

The above description is applicable to a case where there is a very close, or exact, match between the new condition and a known condition for which a parameterisation of a downstream task is known. In this case, when the prediction confidence Pr is above the confidence threshold, and when the degree of similarity of the one or more predicted confidence features is greater than a matching threshold, the method further comprises: retrieving machine learning model from a parameter database, the retrieved machine learning model having a parameterisation parameterisation resulting from training the machine learning model within images having the condition matching the obtained image, wherein the parameterisation database include a plurality of machine learning models each have a different parameterisation derived from training the machine learning model using images having a different condition; and performing the task by applying the obtained image to the retrieved machine learning model A similar condition may use a similar approach. Such a condition is where the match between the features of the new condition and features for a known condition are similar but not closely matched. For example, the difference is between a first and second threshold. In this case, the parameters retrieved from the parameter database P DB at 172 may be interpolated from a known closest parameterisation. For example, weights of a model for a closely matching parameterisation may be interpolated to generate a similar model with a new set of weights. The downstream specific task 174 may be performed using the model with the interpolated parameterisation.

In other words, for this case, when the predicted confidence is above the confidence threshold, and when the degree of similarity of the one or more predicted confidence features is greater than a dissimilar threshold and below a matching threshold, the method further comprises: retrieving a machine learning model from a parameter database, the retrieved machine learning model having a parameterisation resulting from training the machine learning model within images having the condition closest to the obtained image, wherein the parameterisation database include a plurality of machine learning models each have a different parameterisation derived from training the machine learning model using images having a different condition; modifying the retrieved machine learning model by interpolating its parameterisation using a difference between the predicted condition features and condition features of a condition associated with the retrieved machine learning model; and performing the task by applying the obtained image to the machine learning model having the interpolated parameterisation.

In either case, the method may then comprise further comprising controlling the autonomous vehicle to traverse a route based on an outcome of performing the task.

Conversely, as per the method according to FIG. 16, when the predicted confidence is below the confidence threshold, and/or when the degree of similarity of the one or more predicted confidence features is less than a dissimilar threshold, the method further comprises: storing the retrieved image as an image with an unknown condition; and optionally performing, by the autonomous vehicle, a minimal risk manoeuvre. The minimal risk manoeuvre may include, for example, an emergency stop or pulling over to the side of the road, for example.

As should be evident from the above description, task may be selected from a list including semantic segmentation, object detection, and object recognition.

As should be evident from the above description, the condition of the image may be selected from a list including a weather type, a grade of weather type, light, a grade of light, a time of day, and a season. This list is not exhaustive. The condition may just as well be characterised by the features or summary/statistics of features it produces in the condition classifier.

As is evident from the above description, FIG. 17 describes a method that can be summarised as a computer-implemented method of an autonomous vehicle performing a task using a machine learning model, the computer-implemented method comprising: obtaining an image of an environment of the autonomous vehicle; applying the obtained image to a condition classifier, wherein the condition classifier is configured to generate one or more values associated with a condition of the obtained image; determining a parameterisation of the machine learning model based on the one or more values; and performing the task by applying the input image to the machine learning model with the determined parameterisation.

The one or more values may comprise the predicted condition features PCF, the predicted condition PC, and the predicted confidence Pr.

Figure 18:
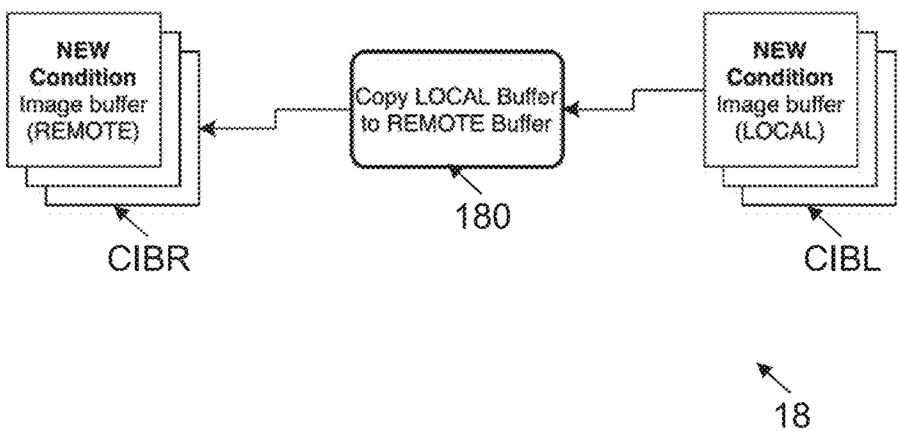
FIG. 18 schematically depicts a method to an exemplary embodiment, in detail.

FIG. 18 schematically depicts a method 18 of according to an exemplary embodiment, in detail. More specifically, FIG. 18 schematically depicts a method 18 of storing a new condition in an image buffer (REMOTE). The on-vehicle (LOCAL) Training Data Buffer CIBL may be transferred wirelessly 180, by copying, to a REMOTE Training Data Buffer CIBR, for example in a Data Center.

Figure 19:
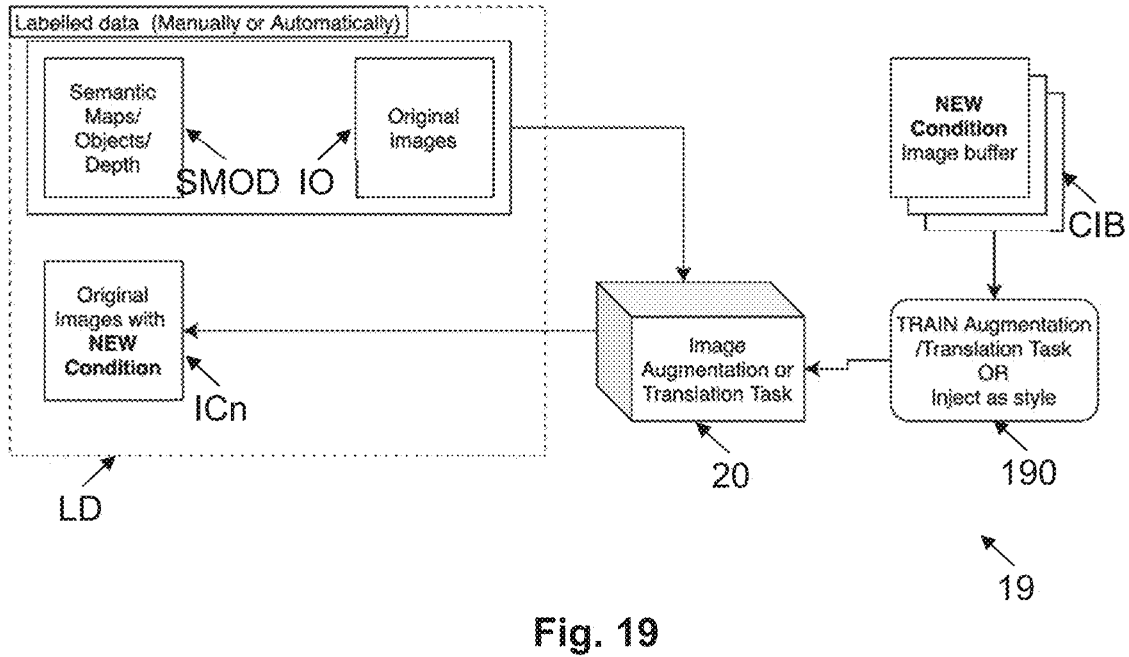
FIG. 19 schematically depicts a method to an exemplary embodiment, in detail.

FIG. 19 schematically depicts a method 19 to an exemplary embodiment, in detail. More specifically, FIG. 19 schematically depicts a method 19 of training an image augmentation model or an image translation model using images with the new condition. The image augmentation model (e.g. a GAN) may be the image augmentation model 20 from FIG. 2. The image translation model (e.g. a cycle-GAN) may be the image translation model 20 from FIG. 4.

In this way, training the image augmentation model or image translation model may mean re-training the respective model that previously been trained on a most closely matched condition.

In retraining the respective model, images with new conditions are retrieved from the new condition image buffer CIB (LOCAL OR REMOTE) and training of the respective model occurs at 190. In addition, the new condition image may be used to inject the new condition as a style on an image. The newly training model 20 may generate new image, namely the original images with the new condition ICn.

Figure 20:
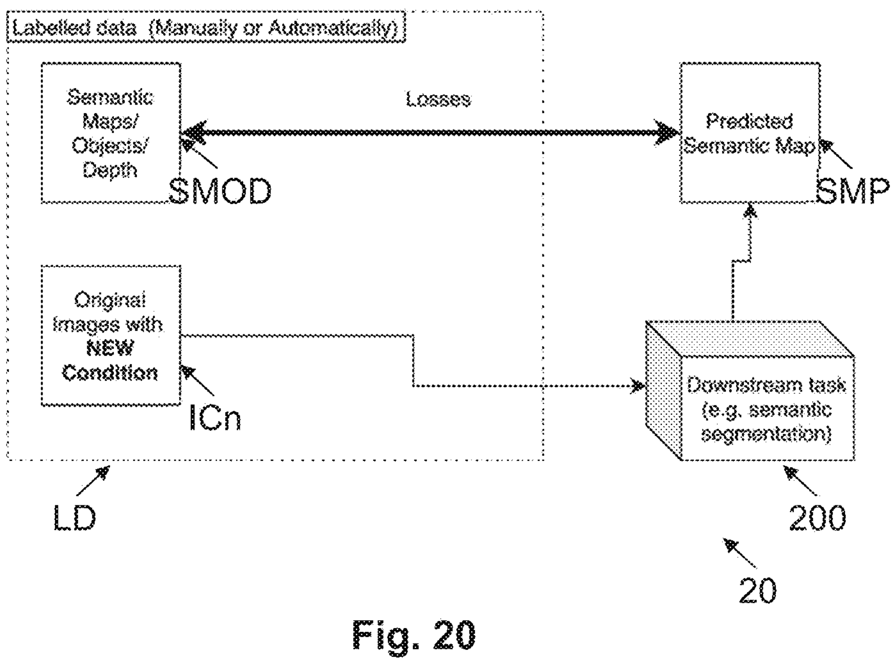
FIG. 20 schematically depicts a method to an exemplary embodiment, in detail.

FIG. 20 schematically depicts a method 20 to an exemplary embodiment, in detail. More particularly, FIG. 20 schematically depicts a method 20 of training, or re-training, a downstream task, e.g. semantic segmentation. As explained with reference to FIG. 17, when prediction features of the condition classifier processing an image with unknown condition match features in the condition feature database, a discrete parameterisation of a downstream tak model, e.g. a semantic segmentation model may be selected from the parameter database. Where the condition features are close to features from the condition feature database CF DB, a discrete parameterisation from the parameter database P DB may be selected and interpolated accordingly. However, in situations where the features are dissimilar, e.g. outside the second threshold described above, the downstream task is not performed. In such cases, the downstream task model needs to be retrained to a new parameterisation for the new condition.

The downstream task model may be retrained by taking the parameterisation of a previously trained downstream task model and retraining it using the original images with new condition ICn and reducing losses between a predicted sematic map SMP and a known semantic map SMOD for that original image. This is possible because the ground truths are the same.

It should be appreciated that the method 20 of FIG. 20 can be summarised as a computer-implemented method of training a machine learning model of an autonomous vehicle to perform a task using an input image, the computer-implemented method comprising: obtaining a plurality of images with an unknown condition; generating a predicted semantic map by applying the plurality of obtained images with the unknown condition to a machine learning model; optimising parameters of the machine learning model by minimising an error between the predicted semantic map and a semantic map ground truth to generate a parameterisation of the machine learning model for the unknown condition; and storing the generated parameterisation of the machine learning model in a parameter database, the parameter database configured to store a plurality of machine learning models each having a different parameterisation, each parameterisation associated with a unique condition.

Furthermore, the generating a predicted semantic map by applying the plurality of obtained images with the unknown condition to a machine learning model may comprise generating a predicted semantic map SMP by applying the plurality of obtained images ICn with the unknown (or new) condition to a machine learning model previously trained using images having a different condition to the unknown condition.

As above, the unknown and the unique condition are each selected from a list including a weather type, a grade of weather type, light, a grade of light, a time of day, and a season. The term "grade" may be used to define an amount of a certain condition. For example, grades of light may be 0% for fully dark, e.g. in a tunnel at night with no artificial lights, 100% may be a grade of fully lit, e.g. during daylight, and 50% grade light may be at an evening time where light is still evident but is diminished compared to earlier in the day.

In addition, the task may be selected from a list including semantic segmentation, object detection, and object recognition.

Figure 21:
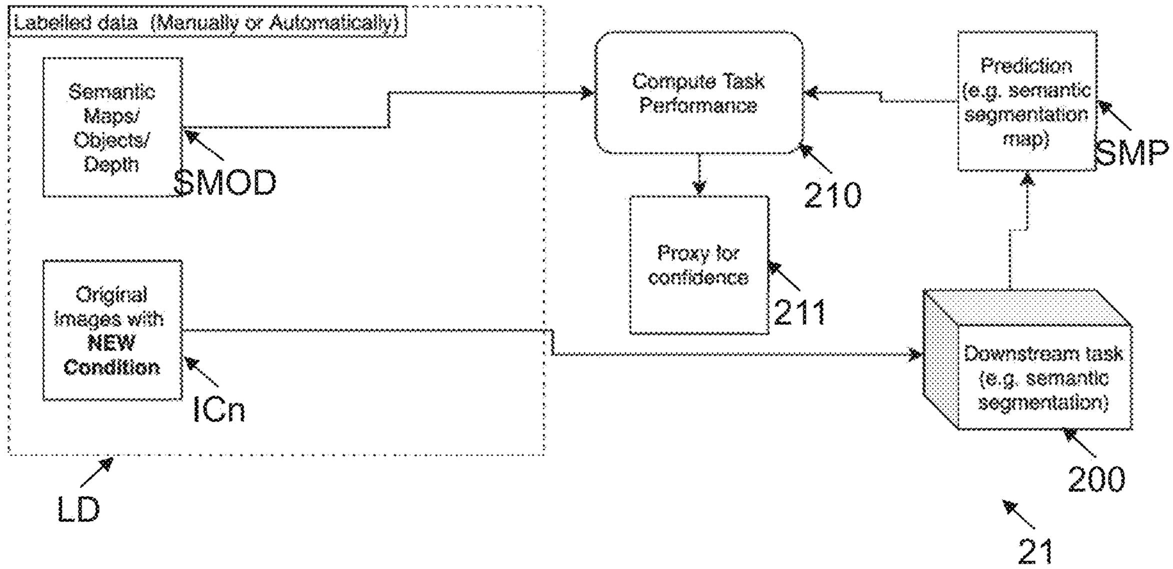
FIG. 21 schematically depicts a method to an exemplary embodiment, in detail.
Figure 22:
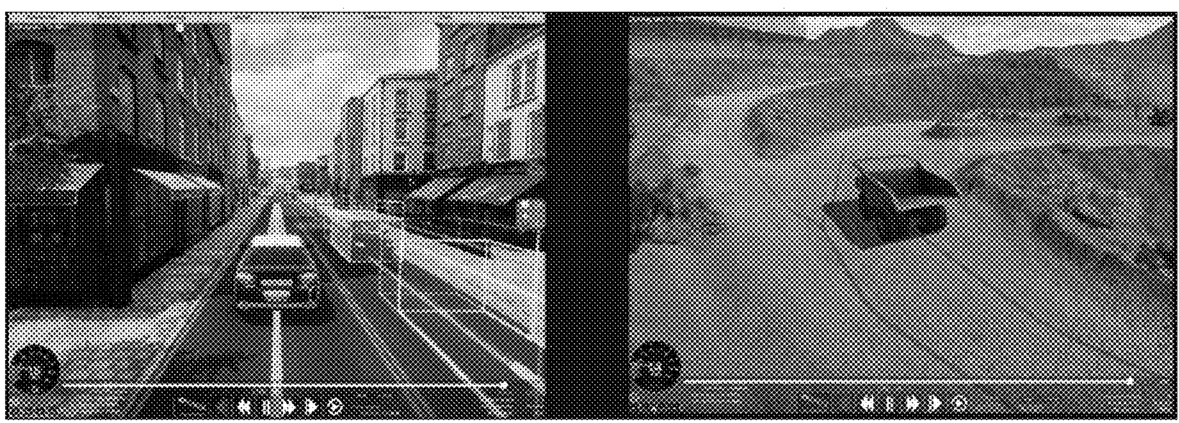
FIGS. 22 to 24 shows examples of images.
Figure 23:
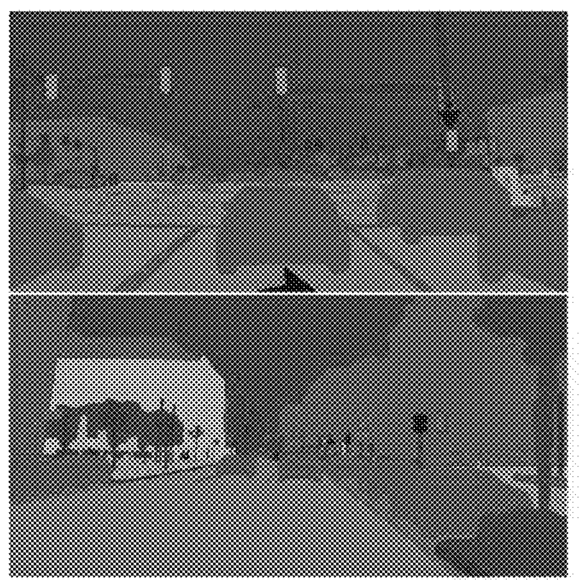
Figure 23:
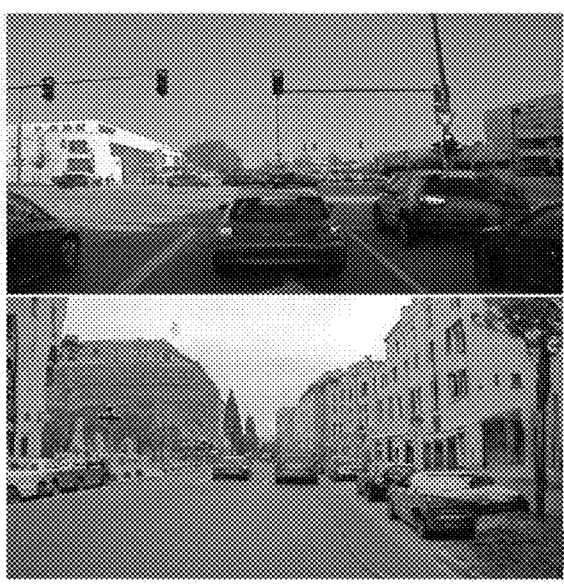
Figure 24:

FIG. 21 schematically depicts a method 21 to an exemplary embodiment, in detail. Additionally, and quite importantly, the newly created data along with the original ground truth (segmentation maps, object bounding boxes, depth etc.) can be used to check the performance of existing tasks 210 by using the prediction performance as a proxy for confidence 211 (global, local, instance or pixel-wise). This represents a key aspect of continual, life-long Verification and Validation, being not only especially useful but also crucial for effective deployment of autonomous platforms in both existing, continuously changing/evolving and new domains.

The processes shown in FIG. 15, FIG. 16, 17, and FIG. 21 may primarily take place on-vehicle.

The process shown in FIG. 18 may wirelessly transfer the Training Data Buffer to a Data Center.

The processes shown in FIG. 19 and FIG. 20 may happen in a Data Center.

Alternatively, all processes may happen on-vehicle entirely or in a Data Center entirely.

The present methods may be embodied as a transitory, or non-transitory, computer-readable medium having instructions stored thereon that, when executed by one or more processors, cause the one or more processors to perform and of the foregoing computer-implemented methods. Furthermore, there is also provided herein an autonomous vehicle including storage, one or more processors, one or more image sensors, and one or more actuators, wherein the storage includes the transitory, or non-transitory, computer-readable medium.

All processes may happen in real-time or near-real-time, continuously (every piece of data with a new condition is used immediately in the training process) or discretely (data is clustered based on predicted condition or based on predicted condition features and used in training when a certain amount has accumulated).

Although a preferred embodiment has been shown and described, it will be appreciated by those skilled in the art that various changes and modifications might be made without departing from the scope of the invention, as defined in the appended claims and as described above.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The subject-matter may be understood with reference to the following clauses.

Clause 1. A computer-implemented method of generating training data, the method comprising:

providing a representation of an environment, wherein the representation of the environment has a defined structure and/or a defined geometry; and generating the training data comprising a set of transformed representations, including a first transformed representation, of the environment by transforming the representation of the environment to the set of transformed representations, including the first transformed representation, of the environment;

wherein providing the representation of the environment comprises synthesizing, at least in part, an image of the environment using semantic information.

Clause 2. The method according to clause 1, wherein providing the representation of the environment comprises acquiring, at least in part, the image of the environment.

Clause 3. The method according to any previous clause, wherein synthesizing, at least in part, the image of the environment using the semantic information comprises obtaining images or parts thereof corresponding to the semantic information from a database or by learning.

Clause 4. The method according to any previous clause, wherein providing the representation of the environment comprises semantically composing, at least in part, the image of the environment.

Clause 5. The method according to any previous clause, wherein providing the representation of the environment comprises inpainting the image of the environment.

Clause 6. The method according to any previous clause, wherein generating the training data by transforming the representation of the environment to the set of transformed representations, including the first transformed representation, of the environment comprises generating the training data by transforming the representation of the environment to the set of transformed representations, including the first transformed representation, of the environment using a respective set of trained transforms, including a first trained transform.

Clause 7. The method according to any previous clause, wherein generating the training data by transforming the representation of the environment to the set of transformed representations, including the first transformed representation, of the environment comprises generating the training data by transforming the representation of the environment to the set of transformed representations, including the first transformed representation, of the environment using a respective set of heuristics-based transforms, including a first heuristics-based transform.

Clause 8. The method according to any previous clause, wherein generating the training data by transforming the representation of the environment to the set of transformed representations, including the first transformed representation, of the environment comprises generating the training data by transforming the representation of the environment to the set of transformed representations, including the first transformed representation, of the environment using a respective set of augmentations, including a first augmentations.

Clause 9. The method according to any previous clause, wherein generating the training data by transforming the representation of the environment to the set of transformed representations, including the first transformed representation, of the environment comprises generating the training data by transforming the representation of the environment to the set of transformed representations, including the first transformed representation, of the environment using a respective set of conditions, including a first condition.

Clause 10. The method according to any previous clause, wherein generating the training data by transforming the representation of the environment to the set of transformed representations, including the first transformed representation, of the environment comprises blending a set of representations of the environment.

Clause 11. The method according to any previous clause, wherein the first transformed representation of the environment has the defined structure and/or the defined geometry of the representation of the environment.

Clause 12. The method according to any of clauses 1 to 10, wherein generating the training data by transforming the representation of the environment to the set of transformed representations, including the first transformed representation, of the environment comprises redefining the defined structure of the representation of the environment to a redefined structure of the first transformed representation of the environment.

Clause 13. A computer-implemented method of training a machine learning, ML, algorithm, the method comprising:

generating training data comprising a set of transformed representations, including a first transformed representation, of an environment according to any previous claim; and training the ML algorithm comprising classifying the set of transformed representations according to a set of classes, including a first class.

Clause 14. The method according to clauses 13, wherein the set of classes, including the first class, is a set of conditions, including a first condition.

Clause 15. The method according to clause 14, comprising identifying a set of characteristic features, including a first characteristic feature, associated with the first condition.

Clause 16. A computer-implemented method of determining a class of a representation of an environment using a machine learning, ML, algorithm trained according to any of clauses 13 to 15, the method comprising:

determining the class of the representation of the environment comprising inferring the class of the representation of the environment using the trained ML algorithm.

Clause 17. The method according to clause 16, comprising identifying a set of features, including a first feature, associated with a condition of the representation of the environment.

Clause 18. The method according to clause 17, comprising calculating a confidence score of the inferred class.

Clause 19. The method according to any of clauses 17 to 18, comprising comparing the identified set of features with a set of characteristic features associated with the condition of the representation of the environment.

Clause 20. The method according to clause 19, comprising storing the representation of the environment based on a result of the comparing.

Clause 21. The method according to clause 20, comprising training a transform using the stored representation of the environment.

Clause 22. The method according to clause 21, comprising generating training data using the trained transform.

Clause 23. The method according to clause 22, comprising training the ML algorithm using the generated training data.

Clause 24. The method according to clause 22, comprising validating the ML algorithm using the generated training data.

Clause 25. The method according to clause 19, comprising implementing an action based on a result of the comparing.

The invention claimed is:

1. A computer-implemented method of an autonomous vehicle performing a task using a machine learning model, the computer-implemented method comprising:

obtaining an image of an environment of the autonomous vehicle;

applying the obtained image to a condition classifier, wherein the condition classifier comprises a neural network, wherein the condition classifier is configured to generate one or more values associated with a condition of the obtained image, wherein the one or more values comprise one or more predicted condition features and a prediction confidence;

comparing the prediction confidence to a confidence threshold;

determining a degree of similarity between the one or more predicted condition features and one or more respective condition features of a known condition;

when the prediction confidence is above the confidence threshold, and when the degree of similarity of the one or more predicted condition features is greater than a dissimilar threshold and below a matching threshold:

retrieve a machine learning model from a parameter database, the retrieved machine learning model having a parameterization resulting from training the machine learning model using images having a condition closest to the condition of the obtained image, wherein the parameterization database includes a plurality of machine learning models each having a different parameterization derived from training using images having a different condition;

determine a parameterization of the machine learning model based on the one or more values;

modify the retrieved machine learning model by interpolating its parameterization using a difference between the predicted condition features and condition features of a condition associated with the retrieved machine learning model;

perform the task by applying the obtained image to the modified machine learning model with the interpolated parameterization.

2. The computer-implemented method of claim 1, wherein at least one of the one or more predicted condition features comprises an output of an activation function.

3. The computer-implemented method of claim 1, wherein the prediction confidence comprises a probability from an output layer of the neural network that the condition of the obtained image is one of one or more known conditions of images.

4. The computer-implemented method of claim 1, wherein, when the prediction confidence is above the confidence threshold, and when the degree of similarity of the one or more predicted condition features is greater than a matching threshold, the method further comprises:

retrieving a machine learning model from a parameter database, the retrieved machine learning model having a parameterization resulting from training the machine learning model using images having the condition of the obtained image, wherein the parameterization database includes a plurality of machine learning models each having a different parameterization derived from training using images having a different condition; and performing the task by applying the obtained image to the retrieved machine learning model.

5. The computer-implemented method of claim 1, wherein, when the prediction confidence is below the confidence threshold, and/or when the degree of similarity of the one or more predicted condition features is less than a dissimilar threshold, the method further comprises:

storing the retrieved image as an image with an unknown condition.

6. The computer-implemented method of claim 4 further comprising controlling the autonomous vehicle to traverse a route based on an outcome of performing the task.

7. That computer-implemented method of claim 1, wherein the task is selected from a list including at least one of semantic segmentation, object detection, and object recognition.

8. The computer-implemented method of claim 1, wherein the condition is selected from a list including at least one of a weather type, a grade of weather type, light, a grade of light, a time of day, and a season.

9. The computer-implemented method of any of claim 1, wherein, when the prediction confidence is below the confidence threshold, and/or when the degree of similarity of the one or more predicted condition features is less than a dissimilar threshold, the method further comprises:

storing the retrieved image as an image with an unknown condition; and performing, by the autonomous vehicle, a minimal risk manoeuvre.

10. A non-transitory, computer-readable medium having instructions stored thereon that, when executed by the one or more processors, cause the one or more processors to:

obtain an image of an environment of an autonomous vehicle;

apply the obtained image to a condition classifier, wherein the condition classifier comprises a neural network, wherein the condition classifier is configured to generate one or more values associated with a condition of the obtained image, wherein the one or more values comprise one or more predicted condition features and a prediction confidence;

compare the prediction confidence to a confidence threshold;

determine a degree of similarity between the one or more predicted condition features and one or more respective condition features of a known condition;

when the prediction confidence is above the confidence threshold, and when the degree of similarity of the one or more predicted condition features is greater than a dissimilar threshold and below a matching threshold:

retrieve a machine learning model from a parameter database, the retrieved machine learning model having a parameterization resulting from training the machine learning model using images having a condition closest to the condition of the obtained image, wherein the parameterization database includes a plurality of machine learning models each having a different parameterization derived from training using images having a different condition;

determine a parameterization of the machine learning model based on the one or more values;

modify the retrieved machine learning model by interpolating its parameterization using a difference between the predicted condition features and condition features of a condition associated with the retrieved machine learning model; and perform a task by applying the obtained image to the modified machine learning model with the interpolated parameterization.

11. An autonomous vehicle including storage, one or more processors, one or more image sensors, and one or more actuators, wherein the storage includes a non-transitory, computer-readable medium having instructions stored thereon that, when executed by the one or more processors, cause the one or more processors to:

obtain an image of an environment of an autonomous vehicle;

apply the obtained image to a condition classifier, wherein the condition classifier comprises a neural network, wherein the condition classifier is configured to generate one or more values associated with a condition of the obtained image, wherein the one or more values comprise one or more predicted condition features and a prediction confidence;

compare the prediction confidence to a confidence threshold;

determine a degree of similarity between the one or more predicted condition features and one or more respective condition features of a known condition;

when the prediction confidence is above the confidence threshold, and when the degree of similarity of the one or more predicted condition features is greater than a dissimilar threshold and below a matching threshold:

retrieve a machine learning model from a parameter database, the retrieved machine learning model having a parameterization resulting from training the machine learning model using images having a condition closest to the condition of the obtained image, wherein the parameterization database includes a plurality of machine learning models each having a different parameterization derived from training using images having a different condition;

determine a parameterization of the machine learning model based on the one or more values;

modify the retrieved machine learning model by interpolating its parameterization using a difference between the predicted condition features and condition features of a condition associated with the retrieved machine learning model; and perform a task by applying the obtained image to the modified machine learning model with the interpolated parameterization.

* * * * *